US009883215B2

United States Patent
Eguchi

(10) Patent No.: US 9,883,215 B2
(45) Date of Patent: Jan. 30, 2018

(54) METHOD AND DEVICE FOR COMPRESSING AND EXPANDING IMAGE INTENDED FOR ENCRYPTED COMMUNICATION, PROGRAM, AND STORAGE MEDIUM

(71) Applicant: Lightron International Co., Ltd., Saitama (JP)

(72) Inventor: Mitsuo Eguchi, Saitama (JP)

(73) Assignee: Lightron International Co., Ltd., Saitamashi Saitama (JP)

( * ) Notice: Subject to any disclaimer, the term of this patent is extended or adjusted under 35 U.S.C. 154(b) by 0 days.

(21) Appl. No.: 15/104,616

(22) PCT Filed: Nov. 27, 2014

(86) PCT No.: PCT/JP2014/081480
§ 371 (c)(1),
(2) Date: Jun. 15, 2016

(87) PCT Pub. No.: WO2015/093254
PCT Pub. Date: Jun. 25, 2015

(65) Prior Publication Data
US 2016/0330492 A1    Nov. 10, 2016

(30) Foreign Application Priority Data

Dec. 16, 2013    (JP) .................................. 2013-259046

(51) Int. Cl.
*H04L 29/06*        (2006.01)
*H04N 21/2347*      (2011.01)
(Continued)

(52) U.S. Cl.
CPC .......... *H04N 21/2347* (2013.01); *G09C 5/00* (2013.01); *H04N 19/426* (2014.11); *H04N 19/59* (2014.11); *H04N 19/91* (2014.11); *H04N 21/4356* (2013.01); *H04N 21/4405* (2013.01)

(58) Field of Classification Search
CPC ...... H04N 19/426; H04N 19/59; H04N 19/91; H04N 21/2347; H04N 21/4356; H04N 21/4405
See application file for complete search history.

(56) References Cited

U.S. PATENT DOCUMENTS

| 5,903,648 A | 5/1999 | Javidi ............................. 380/10 |
| 2007/0250717 A1* | 10/2007 | Kumagai ................. H04K 1/00 713/176 |
| 2008/0095358 A1 | 4/2008 | Eguchi et al. .................. 380/28 |

FOREIGN PATENT DOCUMENTS

| AU | 2002301752 B2 * 11/2001 ......... H04N 21/2347 |
| EP | 0719045 A2    6/1996 |

(Continued)

OTHER PUBLICATIONS

Yang, H.-G. and Kim, E-S., Practical Image Encryption Scheme by Real-Valued Data, Optical Engineering, Sep. 1, 1996, vol. 35 Issue 9, p. 2473-2478.

(Continued)

*Primary Examiner* — Jeffrey Pwu
*Assistant Examiner* — Thong Truong
(74) *Attorney, Agent, or Firm* — Harrington & Smith

(57) ABSTRACT

An object of the present invention is to provide a method, a device, programs, and storage media for solving a problem that it is impossible to losslessly compress a digital image while being encrypted, to transmit the digital image, and to expand the digital image at a receiving side to restore the digital image with no artifact. An image or video is subjected to discrete convolution with an encryption key image, to be defocused beyond recognition, thus being encrypted, is further subjected to entropy-coding lossless compression, and is transmitted over the Internet. The compressed image or video is expanded at a receiving side, and iterative operations are performed on the basis of a Bayse probabilistic formula by using the separately-delivered encryption key image, to restore the image or video before encryption.

20 Claims, 22 Drawing Sheets

(51) Int. Cl.
*G09C 5/00* (2006.01)
*H04N 21/4405* (2011.01)
*H04N 19/59* (2014.01)
*H04N 19/426* (2014.01)
*H04N 21/435* (2011.01)
*H04N 19/91* (2014.01)

(56) References Cited

FOREIGN PATENT DOCUMENTS

| | | |
|---|---|---|
| JP | 08288940 | 11/1996 |
| JP | 09307772 | 11/1997 |
| JP | 2010-103867 | 5/2010 |
| JP | 4575387 B | 8/2010 |
| JP | 2012-39181 | 2/2012 |
| KR | 101145110 B1 | 5/2012 |
| WO | WO 2006/041126 A1 | 4/2006 |

OTHER PUBLICATIONS

Zhang, S. and Karim, M.A., Color Image Encryption Using Double Random Phase Encoding, Microwave and Optical Technology Letters, Jun. 5, 1999, vol. 21 No. 5, p. 318-323.

Yang, Hoon-Gee, et al., "Practical Image Encryptions Scheme by Real-Valued Data", Opt. Eng. vol. 35, Issue 9, Sep. 1, 1996, 1 page, abstract only.

Zhang, Shuqun, et al., "Color Image Encryption Using Double Random Phase Encoding", Microwave and Optical Technology Letters, vol. 21, Issue 5, 1999, 2 pages, abstract only.

* cited by examiner

[1] — IMAGE SIZE OF DIGITAL IMAGE 1
[2] — IMAGE SIZE OF ENCRYPTION KEY IMAGE 2

[2] – IMAGE SIZE OF ENCRYPTION KEY IMAGE 2
[6] – IMAGE SIZE OF RECEIVED ENCRYPTED IMAGE 6

METHOD AND DEVICE FOR COMPRESSING AND EXPANDING IMAGE INTENDED FOR ENCRYPTED COMMUNICATION, PROGRAM, AND STORAGE MEDIUM

TECHNICAL FIELD

The present invention relates to a cryptographic-communication image compressing/expanding device and method in which, for cryptographic communication, a digital image is encrypted by using an encryption key image, is further subjected to lossless compression, and is transmitted, and iterative operations are performed by a Bayse probabilistic method from the encrypted image expanded at a receiving side and the separately-delivered encryption key image, thereby restoring the image; first to second programs that cause a computer to execute the cryptographic-communication image compressing/expanding method; third to fourth programs that configure means constituting a cryptographic-communication image compressing/expanding device and that cause a computer to implement the means; and first to fourth storage media that respectively store the first to fourth programs in an encrypted manner, that can be connected to a computer, and that can be read by the computer.

BACKGROUND ART

Recently, the number of people using the Internet has rapidly increased, and thus the importance of security and the importance of reducing the traffic load are increasing. For example, even when the Internet is used as a leased line by using VPN (Virtual Private Network) technology, to ensure security, encryption of data to be transmitted and received is recommended to prepare for the possibility of crosstalk. However, a large amount of arithmetic processing is required for encryption and decryption with sufficient strength, and thus, there is a problem in that videos and images cannot be encrypted with sufficient strength. Furthermore, in conventional techniques, in order to reduce the traffic load on the Internet, when a video or an image is transmitted, the amount of data is often compressed to several percent to several tens of percent by using an irreversible compression technology, such as MPEG4, thus causing a problem in that the quality of the video or the image obtained after transmission and expanding is reduced.

One of methods of encrypting and decrypting images is a technique invented and patent-registered (PTL 1) in Japan by the inventor of the present invention. In this method, a digital image is transferred by using a known transfer function, to remove a particular frequency in frequency space and to be encrypted, and iterative operations are performed on the basis of a Bayse probabilistic formula from the distribution of the encrypted data and the transfer function used for encryption, thus restoring the digital image. However, this method merely reduces the amount of image data in frequency space and has a problem in that there is no change in the data amount itself to be transmitted, and thus, the traffic load remains unchanged.

Thus, the inventor of the present invention has invented and filed a patent for a technique of transmitting images and videos over a network while reducing the traffic load (PTL 2). In this method, image and video data is smoothed to remove information corresponding to a high-frequency portion, is coded by using a compression technology, such as JPEG or MPEG, is transmitted, and is decoded, at the receiving side, by using an expanding technology, such as JPEG or MPEG, corresponding to the method used at the transmitting side, and then image restoration is performed by using the Richardson-Lucy method or the like. However, although this method exhibits a high compression ratio up to 1/100, an image is divided into microblocks and is quantized, and thus there is concern about the occurrence of noise that would be caused by enhancement of block boundaries at the time of image restoration, in some cases. Furthermore, transmitted images are accumulated, and thus there is a problem in that this method lacks real-time characteristics and is not suitable for video processing.

PTL 3 discloses a method in which the encryption method of PTL 1 is used to reduce the resolution of an image, thus degrading the image, and to encrypt the image. In PTL 3, the resolution of an image is degraded to a level beyond that at which, for example; the number plate of a vehicle can be recognized, by using the encryption method of PTL 1, the image is transmitted to a receiving device over a LAN (Local Area Network) or the Internet, and, at the receiving device, iterative operations are performed from only information of the received degraded single image by using an encrypted-data decrypting device of PTL 1, thus restoring the image. However, as described in PTL 3, the technique of PTL 3 has a configuration in which the transfer function used for encryption is not delivered every time and thus has a constraint problem in that the transfer function used for encryption must be known, a problem in that restoration of the transfer function is required to restore the degraded image, a problem in that the transfer function used for encryption needs to be fixed to a known function, thus weakening the security, and concerns that a failure to identify the transfer function may result in a restoration failure.

Methods for compressing, encrypting, and transmitting an image include encryption facsimile. For example, in a method of PTL 4, a document is read as an image, the image is divided into blocks, is compressed, and is encrypted by using an encryption key, in units of blocks, and the blocks are arrayed, with read-control patterns being interposed therebetween, to configure an image document. Then, the image document is combined with a plain text document that can be public, such as a delivery address, and is then transmitted. At the receiving side, a tilt or displacement of the received document is corrected, the document is printed, the printed document is re-read by the receiving device, an encryption key is specified to decrypt and expand a graphic at an encrypted portion, and a reproduced document is printed. The method of PTL 4 has a problem in that an image is subjected to a change due to garbled bits during transmission, whereas the encrypted portion has a complicated patterned image, which is resistant to leakage during transmission; a problem in that this method cannot be used to transmit color images; a problem in that data is not packetized, and thus this method is not suitable for Internet communications; a problem in that this method is not always a continuous transmission means; and a problem in that printing is required once, which complicates the operation.

LIST OF PRIOR ART DOCUMENTS

Patent Literature

{PTL 1} Patent Registration Number: Publication of Japanese Patent No. 4575387
{PTL 2} Patent Publication Number: Japanese Unexamined Patent Application, Publication No. 2012-39181

{PTL 3} Patent Publication Number: Japanese Unexamined Patent Application, Publication No. 2010-103867
{PTL 4} Patent Publication Number: Japanese Unexamined Patent Application, Publication No. Hei 09-307772

SUMMARY OF INVENTION

Problem to be Solved by Invention

All of the methods described in PTLs 1 to 4 have a problem in that it is impossible to remove a high-frequency region in frequency space of a digital image while the digital image is being encrypted, to losslessly compress the digital image, to transmit the digital image via a network (LAN and the Internet), and to expand the digital image at the receiving side to obtain an image that has no artifact and that can be said to be visually reversible with respect to the digital image before transmission, i.e., to obtain an image quality that is equivalent to that of the digital image before transmission; and it is impossible to perform a series of steps, from encryption to decryption, in approximately real time.

Thus, in order to solve the above-described problems, an object of the present invention is to provide a cryptographic-communication image compressing/expanding method and device, programs, and storage media.

Solution to Problem

In order to solve the above-described problems, a first invention of the present invention provides a cryptographic-communication image compressing/expanding method. In the cryptographic-communication image compressing/expanding method, a digital image is convolved with an encryption key image to remove high-frequency components in the frequency space of the digital image and to make the digital image unrecognizable, thereby being encrypted; this encrypted image is subjected to entropy-coding compression (lossless compression) and is transmitted to another computer on a network; the encrypted image subjected to lossless compression is received at the computer serving as a receiving side; the encrypted image subjected to lossless compression is first expanded by the inverse method to that used for compression, to obtain the encrypted image; and a predetermined number of iterative operations is performed on the basis of a Bayse probabilistic restoration formula (Formula (3) to be described later) from the separately-delivered encryption key image and the encrypted image, thereby restoring the digital image. According to this method, the series of steps does not include a quantization step, thus causing no quantization noise and no noise based on block boundaries; an encryption key image is selected so as to make the encryption strength weak, thereby requiring a small number of iterative operations and ensuring real-time characteristics; the encryption key image is separately delivered after being subjected to encryption and lossless compression, thus allowing definite restoration and being resistant to leakage; and a different encryption key can be used every time, thus providing a high security strength. Therefore, all of the above-described conventional problems can be solved.

A first invention of the present invention is the same as what is described in claim 1 and relates to a cryptographic-communication image compressing/expanding method. The cryptographic-communication image compressing/expanding method is characterized by including: (S1) an image retrieving step of retrieving a digital image; (S2) a step of preparing a grayscale encryption key image with a desired encryption strength; (S3) an encryption step of subjecting the digital image to convolution with the encryption key image, to remove high-frequency components in the digital image, to reduce the resolution thereof, and to encrypt the digital image, thus obtaining an encrypted image; (S4) a step of subjecting the encrypted image to entropy coding, thus converting the encrypted image into encrypted-image code; (S5) a step of transmitting the encrypted-image code to another computer on the network; (S6) a step of receiving the encrypted-image code at the computer; (S7) a step of decoding, at the computer, the encrypted-image code by using a decoding method corresponding to encoding used for the entropy coding, thus generating a received encrypted image; (S8) a step of decrypting and preparing the encryption key image, which is encrypted in advance, is separately delivered, and is used in the encryption step; and (S9) a digital-image restoring step of restoring, from the encryption key image and the received encrypted image, a maximum-likelihood digital image that has the maximum likelihood of the received encrypted image.

A second invention of the present invention is the same as what is described in claim 2 and relates to the encryption step, which constitutes the cryptographic-communication image compressing/expanding method according to the first invention. The encryption step is characterized by including: (S10) a first correction step of correcting the encryption key image such that the image size of the encryption key image is matched to that of the digital image, thus generating a first corrected encryption key image; (S11) a step of subjecting the first corrected encryption key image to Fourier transformation, thus generating a first-corrected-encryption-key-image spectrum; (S12) a step of subjecting the digital image to de-gamma correction and then dividing the digital image into a red-primary-color image RI, a green-primary-color image GI, and a blue-primary-color image BI; (S13) a step of subjecting the RI, the GI, and the BI to Fourier transformation, thus generating an RI spectrum, a GI spectrum, and a BI spectrum; (S14) a step of multiplying the RI spectrum by the first-corrected-encryption-key-image spectrum and setting the thus-obtained product as an RIE spectrum; (S15) a step of multiplying the GI spectrum by the first-corrected-encryption-key-image spectrum and setting the thus-obtained product as a GIE spectrum; (S16) a step of multiplying the BI spectrum by the first-corrected-encryption-key-image spectrum and setting the thus-obtained product as a BIE spectrum; (S17) a step of subjecting the RIE spectrum, the GIE spectrum, and the BIE spectrum to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and (S18) a step of combining the RE, the GE, and the BE into a single color image and subjecting the color image to gamma correction, thus generating the encrypted image.

A third invention of the present invention is the same as what is described in claim 3 and relates to the digital-image restoring step, which constitutes the cryptographic-communication image compressing/expanding method according to the first invention. The digital-image restoring step is characterized by including: (S20) a second correction step of correcting the encryption key image such that the image size of the encryption key image is matched to that of the received encrypted image, thus generating a second corrected encryption key image; (S21) a step of dividing the received encrypted image into a red-primary-color image, a green-primary-color image, and a blue-primary-color image; (S22) a step of setting the second corrected encryption key image as an H image, setting the red-primary-color image as a Y image, restoring an F image by using an image-restoration calculation step in which the F image is restored from the H image and the Y image, and setting this F image as a red-primary-color digital image; (S23) a step of setting the green-primary-color image as a Y image, restoring an F image by using the image-restoration calculation step, and setting this F image to a green-primary-color digital image; (S24) a step of setting the blue-primary-color image as a Y image, restoring an F image by using the image-restoration calculation step, and setting this F image as a blue-primary-color digital image; and (S25) a step of combining the red-primary-color digital image, the green-primary-color digital image, and the blue-primary-color digital image into the maximum-likelihood digital image.

A fourth invention of the present invention is the same as what is described in claim 4 and relates to the image-restoration calculation step S48 that constitutes the digital-image restoring step according to the third invention. The image-restoration calculation step S48 is characterized by including: (S30) a step of subjecting the H image to Fourier transformation, thus obtaining an H-image spectrum; (S31) a step of setting a maximum number of iterative operations; (S32) a step of setting a counter for counting the number of iterative operations to 0, thus resetting the counter; (S33) a step of subjecting the Y image to de-gamma correction, thus obtaining a Y image, and of further setting the Y image to F-image initial values; (S34) a step of subjecting the F-image initial values to Fourier transformation, thus obtaining an F-image initial-value spectrum; (S35) a step of multiplying the H-image spectrum by the F-image initial-value spectrum and setting the thus-obtained product as a first function; (S36) a step of inverting the first function, thus generating a second function; (S37) a step of multiplying the Y image by the second function and setting the thus-obtained product as a third function; (S38) a step of subjecting the third function to Fourier transformation, thus obtaining a third-function spectrum; (S39) a step of obtaining a reversal function of the H image and setting the obtained function to a fourth function; (S40) a step of subjecting the fourth function to Fourier transformation, thus obtaining a fourth-function spectrum; (S41) a step of multiplying the third-function spectrum by the fourth-function spectrum and setting the thus-obtained product as a fifth function; (S42) a step of subjecting the fifth function to inverse Fourier transformation, thus obtaining a sixth function; (S43) a step of multiplying the sixth function by the F-image initial values and setting the thus-obtained product as an F image; (S44) a step of setting the F image to the F-image initial values; (S45) a step of adding. 1 to the counter; (S46) a step of verifying a hypothesis in which the value of the counter exceeds the maximum number of iterative operations, returning to step S34 if the verification result is false, and advancing to step S47 if the verification result is true; and (S47) a step of subjecting the F image to gamma correction, thus obtaining an F image, and of outputting the F image.

A fifth invention of the present invention is the same as what is described in claim 5 and relates to a second aspect of the image-restoration calculation step according to the fourth invention. The second aspect of the image-restoration calculation step is characterized in that a point-symmetric image is used as the encryption key image, thereby eliminating steps S39 and S40 and changing step S41 to (S41C) a step of multiplying the third-function spectrum by the H-image spectrum and setting the thus-obtained product as a fifth function.

A sixth invention of the present invention is the same as what is described in claim 6 and relates to the first correction step, which constitutes the encryption step according to the second invention. The first correction step is characterized by including: (S50) a step of matching the pixel size of the encryption key image to the pixel size of the digital image; (S51) a step of preparing the first corrected encryption key image having the same image size as the digital image and no data; (S52) a-step of comparing the image size of the encryption key image with the image size of the digital image, advancing to step (S53) if they are equal to each other, advancing to step (S54) if the image size of the encryption key image is smaller than the image size of the digital image, and advancing to step (S57) otherwise; (S53) a step of transferring the encryption key image to the first corrected encryption key image and then ending the first correction step; (S54) a step of moving the encryption key image such that the coordinates of the center pixel of the encryption key image are matched to the coordinates of the center pixel of the first corrected encryption key image; (S55) a step of transferring the encryption key image to the first corrected encryption key image; (S56) a step of transferring pixels in a transferred area of the first corrected encryption key image to a non-transferred area thereof by using boundaries between the transferred area and the non-transferred area as mirror inversion axes and then ending the first correction step; and (S57) a step of reducing the encryption key image so as to be matched to the image size of the digital image, transferring the reduced encryption key image to the first corrected encryption key image, and then ending the first correction step.

A seventh invention of the present invention is the same as what is described in claim 7 and relates to the second correction step, which constitutes the digital-image restoring step according to the third invention. The second correction step is characterized by including: (S60) a step of matching the pixel size of the encryption key image to the pixel size of the received encrypted image; (S61) a step of preparing the second corrected encryption key image having the same image size as the received encrypted image and no data; (S62) a step of comparing the image size of the encryption key image with the image size of the received encrypted image, advancing to step (S63) if they are equal to each other, advancing to step (S64) if the image size of the encryption key image is smaller than the image size of the received encrypted image, and advancing to step (S67) otherwise; (S63) a step of transferring the encryption key image to the second corrected encryption key image and then ending the second correction step; (S64) a step of moving the encryption key image such that the coordinates of the center pixel of the encryption key image are matched to the coordinates of the center pixel of the second corrected encryption key image; (S65) a step of transferring the encryption key image to the second corrected encryption key image; (S66) a step of transferring pixels in a transferred area of the second corrected encryption key image to a non-transferred area thereof by using the boundaries between the transferred area and the non-transferred area as mirror inversion axes and then ending the second correction step; and (S67) a step of reducing the encryption key image so as to be matched to the image size of the received encrypted image, transferring the reduced encryption key image to the second corrected encryption key image, and then ending the second correction step.

An eighth invention of the present invention is the same as what is described in claim 8.

A ninth invention of the present invention is the same as what is described in claim 9.

A tenth invention of the present invention is the same as what is described in claim 10 and relates to a first storage medium that stores a first program according to claim 8 in an encrypted state, that can be connected to a computer, and that can be read by the computer.

An eleventh invention of the present invention is the same as what is described in claim 11 and relates to a second storage medium that stores a second program according to claim 9 in an encrypted state, that can be connected to a computer, and that can be read by the computer.

A twelfth invention of the present invention is the same as what is described in claim 12 and relates to a cryptographic-communication image compressing/expanding device. In the cryptographic-communication image compressing/expanding device, according to the first aspect of the cryptographic-communication image compressing/expanding method or the second aspect of the cryptographic-communication image compressing/expanding method, a digital image is convolved with an encryption key image to remove high-frequency components in the frequency space of the digital image and to make the digital image unrecognizable, thereby being encrypted; this encrypted image is subjected to entropy-coding compression (lossless compression) and is transmitted to another computer on a network; the encrypted image subjected to lossless compression is received at the computer serving as a receiving side; the encrypted image subjected to lossless compression is first expanded by the inverse method to that used for compression, to obtain the encrypted image; and a predetermined number of iterative operations is performed on the basis of a Bayse probabilistic restoration formula (Formula (3) to be described later) from the separately-delivered encryption key image and the encrypted image, thereby restoring the digital image.

The cryptographic-communication image compressing/expanding device is characterized by including: (W1) an image retrieving means for retrieving a digital image; (W2) a means for preparing a grayscale encryption key image with a desired encryption strength; (W3) an encryption means for subjecting the digital image to convolution with the encryption key image, to remove high-frequency components in the digital image, to reduce the resolution thereof, and to encrypt the digital image, thus obtaining an encrypted image; (W4) a means for subjecting the encrypted image to entropy coding, thus converting the encrypted image into encrypted-image code; (W5) a means for transmitting the encrypted-image code to another computer on a network; (W6) a means for receiving, at the computer, the encrypted-image code; (W7) a means for decoding, at the computer, the encrypted-image code by a decoding method corresponding to encoding used to perform entropy coding, thus generating a received encrypted image; (W8) a means for decrypting and preparing the encryption key image, which is encrypted in advance, is separately delivered, and is used in the encryption means; and (W9) a digital-image restoring means for restoring, from the encryption key image and the received encrypted image, a maximum-likelihood digital image that has the maximum likelihood of the received encrypted image.

A thirteenth invention of the present invention is the same as what is described in claim 13 and relates to the encryption means, which constitutes the cryptographic-communication image compressing/expanding device according to the twelfth invention. The encryption means is characterized by including: (W10) a first correction means for correcting the encryption key image such that the image size of the encryption key image is matched to that of the digital image, thus generating a third corrected encryption key image; (W11) a means for subjecting the third corrected encryption key image to Fourier transformation, thus generating a third-corrected-encryption-key-image spectrum; (W12) a means for subjecting the digital image to de-gamma correction and then dividing the digital image into a red-primary-color image RI, a green-primary-color image GI, and a blue-primary-color image BI; (W13) a means for subjecting the RI, the GI, and the BI to Fourier transformation, thus generating an RI spectrum, a GI spectrum, and a BI spectrum; (W14) a means for multiplying the RI spectrum by the third-corrected-encryption-key-image spectrum and setting the thus-obtained product as an RIE spectrum; (W15) a means for multiplying the GI spectrum by the third-corrected-encryption-key-image spectrum and setting the thus-obtained product as a GIE spectrum; (W16) a means for multiplying the BI spectrum by the third-corrected-encryption-key-image spectrum and setting the thus-obtained product as a BIE spectrum; (W17) a means for subjecting the RIE spectrum, the GIE spectrum, and the BIE spectrum to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and (W18) a means for combining the RE, the GE, and the BE into a single color image and subjecting the color image to gamma correction, thus generating the encrypted image.

A fourteenth invention of the present invention is the same as what is described in claim 14 and relates to the digital-image restoring means, which constitutes the cryptographic-communication image compressing/expanding device according to the twelfth invention. The digital-image restoring means is characterized by including: (W20) a second correction means for correcting the encryption key image such that the image size of the encryption key image is matched to that of the received encrypted image, thus generating a fourth corrected encryption key image; (W21) a means for dividing the received encrypted image into a red-primary-color image, a green-primary-color image, and a blue-primary-color image; (W22) a means for setting the fourth corrected encryption key image as an H image, setting the red-primary-color image as a Y image, restoring an F image by using an image-restoration calculation means in which the F image is restored from the H image and the Y image, and setting this F image as a red-primary-color digital image; (W23) a means for setting the green-primary-color image as a Y image, restoring an F image by using the image-restoration calculation means, and setting this F image as a green-primary-color digital image; (W24) a means for setting the blue-primary-color image as a Y image, restoring an F image by using the image-restoration calculation means, and setting this F image as a blue-primary-color digital image; and (W25) a means for combining the red-primary-color digital image, the green-primary-color digital image, and the blue-primary-color digital image into the maximum-likelihood digital image.

A fifteenth invention of the present invention is the same as what is described in claim 15 and relates to the image-restoration calculation means, which constitutes the digital-image restoring means according to the fourteenth invention. The image-restoration calculation means is characterized by including: (W30) a means for subjecting the H image to Fourier transformation, thus obtaining an H-image spectrum; (W31) a means for setting the maximum number of iterative operations; (W32) a means for setting a counter for counting the number of iterative operations to 0, thus resetting the counter; (W33) a means for subjecting the Y image to de-gamma correction, thus generating the Y image, and for setting the Y image to F-image initial values; (W34) a means for subjecting the F-image initial values to Fourier transformation, thus obtaining an F-image initial-value spectrum; (W35) a means for multiplying the H-image spectrum by the F-image initial-value spectrum and setting the thus-obtained product as a seventh function; (W36) a means for inverting the seventh function, thus generating an eighth function; (W37) a means for multiplying the Y image by the eighth function and setting the thus-obtained product as a ninth function; (W38) a means for subjecting the ninth function to Fourier transformation, thus obtaining a ninth-function spectrum; (W39) a means for obtaining a reversal function of the H image and setting the obtained function as a tenth function; (W40) a means for subjecting the tenth function to Fourier transformation, thus obtaining a tenth-function spectrum; (W41) a means for multiplying the ninth-function spectrum by the tenth-function spectrum and setting the thus-obtained product as an eleventh function; (W42) a means for subjecting the eleventh function to inverse Fourier transformation, thus obtaining a twelfth function; (W43) a means for multiplying the twelfth function by the F-image initial values and setting the thus-obtained product as the F image; (W44) a means for setting the F image to the F-image initial values; (W45) a means for adding 1 to the counter; (W46) a means for verifying a hypothesis in which the value of the counter exceeds the maximum number of iterative operations, returning to means W34 if the verification result is false, and advancing to step W47 if the verification result is true; and (W47) a means for subjecting the F image to gamma correction, thus obtaining an F image, and for outputting the F image.

A sixteenth invention of the present invention is the same as what is described in claim 16 and relates to a second aspect of the image-restoration calculation means according to the fifteenth invention. The second aspect of the image-restoration calculation means is characterized in that a point-symmetric image is used as the encryption key image, thereby eliminating the means W39 and W40 and changing the means W41 to (W41C) a means for multiplying the ninth-function spectrum by the H-image spectrum and setting the thus-obtained product as an eleventh function.

A seventeenth invention of the present invention is the same as what is described in claim 17 and relates to the first correction means, which constitutes the encryption means according to the thirteenth invention. The first correction means is characterized by including: (W50) a means for matching the pixel size of the encryption key image to the pixel size of the digital image; (W51) a means for preparing the third corrected encryption key image having the same image size as the digital image and no data; (W52) a means for comparing the image size of the encryption key image with the image size of the digital image, advancing to means (W53) if they are equal to each other, advancing to means (W54) if the image size of the encryption key image is smaller than the image size of the digital image, and advancing to means (W57) otherwise; (W53) a means for transferring the encryption key image to the third corrected encryption key image and then ending the first correction; (W54) a means for moving the encryption key image such that the coordinates of the center pixel of the encryption key image are matched to the coordinates of the center pixel of the third corrected encryption key image; (W55) a means for transferring the encryption key image to the third corrected encryption key image; (W56) a means for transferring pixels in a transferred area of the third corrected encryption key image to a non-transferred area thereof by using the boundaries between the transferred area and the non-transferred area as mirror inversion axes and for ending the first correction; and (W57) a means for reducing the encryption key image so as to be matched to the image size of the digital image, transferring the reduced encryption key image to the third corrected encryption key image, and then ending the first correction.

An eighteenth invention of the present invention is the same as what is described in claim 18 and relates to the second correction means, which constitutes the image-restoration calculation means according to the fourteenth invention. The second correction means is characterized by including: (W60) a means for matching the pixel size of the encryption key image to the pixel size of the received encrypted image; (W61) a means for preparing the fourth corrected encryption key image having the same image size as the received encrypted image and no data; (W62) a means for comparing the image size of the encryption key image with the image size of the received encrypted image, advancing to means (W63) if they are equal to each other, advancing to means (W64) if the image size of the encryption key image is smaller than the image size of the received encrypted image, and advancing to means (W67) otherwise; (W63) a means for transferring the encryption key image to the fourth corrected encryption key image and then ending the second correction; (W64) a means for moving the encryption key image such that the coordinates of the center pixel of the encryption key image are matched to the coordinates of the center pixel of the fourth corrected encryption key image; (W65) a means for transferring the encryption key image to the fourth corrected encryption key image; (W66) a means for transferring pixels in a transferred area of the fourth corrected encryption key image to a non-transferred area thereof by using the boundaries between the transferred area and the non-transferred area as mirror inversion axes and for ending the second correction; and (W67) a means for reducing the encryption key image so as to be matched to the image size of the received encrypted image, transferring the reduced encryption key image to the fourth corrected encryption key image, and then ending the second correction.

A nineteenth invention of the present invention is what is described in claim 19.

A twentieth invention of the present invention is what is described in claim 20.

A twenty-first invention of the present invention is the same as what is described in claim 21 and relates to a third storage medium that stores a third program according to claim 19 in an encrypted state, that can be connected to a computer, and that can be read by the computer.

A twenty-second invention of the present invention is the same as what is described in claim 22 and relates to a fourth storage medium that stores a fourth program according to claim 20 in an encrypted state, that can be connected to a computer, and that can be read by the computer.

Advantageous Effects of Invention

According to the present invention, the following effects are at least partially realized: an effect of causing no quantization noise and no noise based on block boundaries because the series of steps does not include a quantization step; an effect of allowing the encryption strength to be changed by selecting an encryption key image; an effect of easily ensuring real-time characteristics on the basis of the number of iterative operations depending on encryption strength and an effect of saving power; an effect of improving the possibility of restoration by encrypting, losslessly compressing, and separately delivering the encryption key image and an effect of enhancing security by using a different encryption key every time; an effect of improving the leakage resistance by transmitting the encrypted image after being losslessly compressed; an effect of obtaining about a 70% compression ratio, equivalent to that of lossy compression; and an effect of wide applicability because compression can be applied to either letters or images.

DESCRIPTION OF EMBODIMENTS

Best modes for carrying out the present invention will be described, as appropriate, by using the drawings.

In the present invention, a digital image, an encryption key image, an encrypted image, and a received encrypted image are each formed by arraying frameless' square pixels having the same size. Pixels are RGB color pixels formed of 8-bit-depth red primary color (R), 8-bit-depth green primary color (G), and 8-bit-depth blue primary color (B). When R, G, and B have the same number of bits, the pixels are grayscale pixels. In the present invention, an encryption key image consists of grayscale pixels.

In the present invention, in each of the digital image, the encryption key image, the encrypted image, and the received encrypted image, the pixel at the upper left corner serves as the origin, the axis parallel to a row of pixels that extends from the origin in a traverse direction without changing the row is the x axis, and the axis parallel to a column of pixels that extends from the origin in a vertical direction without changing the column is the y axis. Each pixel in the digital image, the encryption key image, the encrypted image, and the received encrypted image can be specified by two-dimensional coordinates (x, y).

In the present invention, the digital image, the encryption key image, the encrypted image, and the received encrypted image have the same image size and have the same coordinates. Furthermore, the digital image, the encryption key image, and the received encrypted image are uncompressed and are images in BMP (BitMaP) or DIB (Device Independent Bitmap) format.

Figure 1:
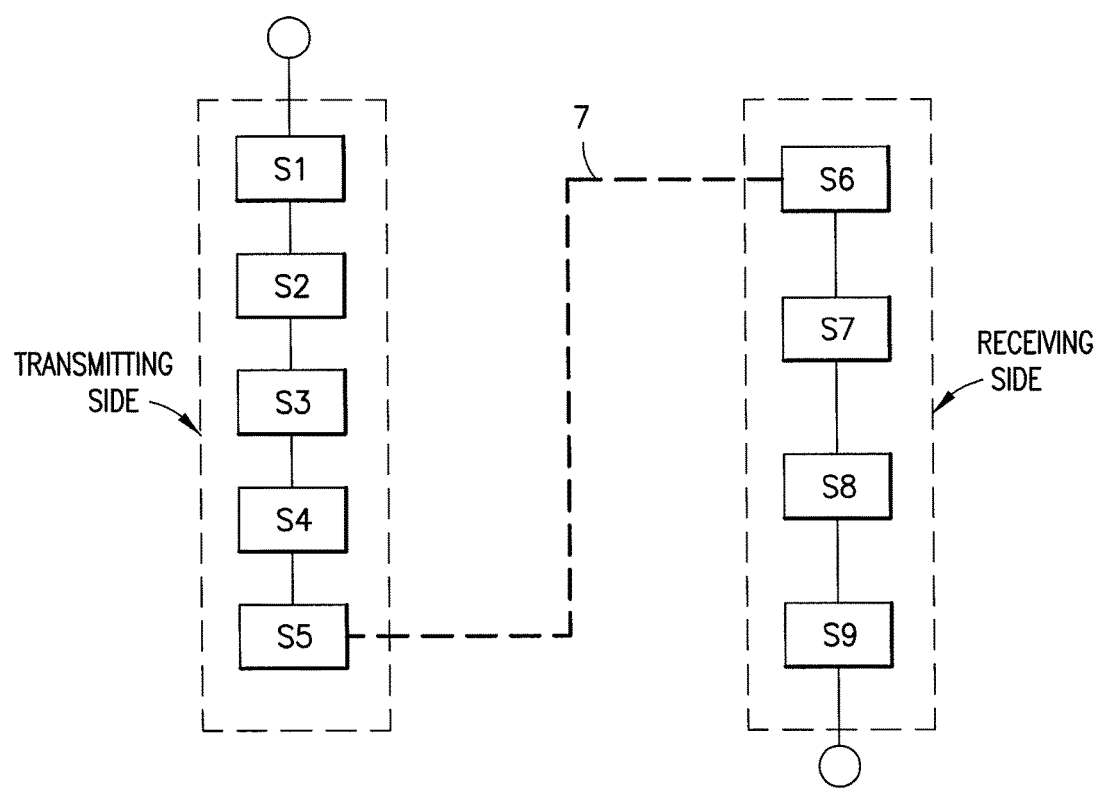
FIG. 1 is a flowchart showing an example procedure in a cryptographic-communication image compressing/expanding method according to a first invention of the present invention.

FIG. 1 is a flowchart showing an example procedure in a cryptographic-communication image compressing/expanding method according to a first invention of the present invention.

The cryptographic-communication image compressing/expanding method shown in FIG. 1 is characterized by including: (S1) an image retrieving step of retrieving a digital image 1; (S2) a step of preparing a grayscale encryption key image 2 with a desired encryption strength; (S3) an encryption step of subjecting the digital image 1 to convolution with the encryption key image 2, to remove high-frequency components in the digital image 1, to reduce the resolution thereof, and to encrypt the digital image 1, thus obtaining an encrypted image 3; (S4) a step of subjecting the encrypted image 3 to entropy coding, thus converting the encrypted image 3 into encrypted-image code 4; (S5) a step of transmitting the encrypted-image code 4 to another computer 5 on a network 7; (S6) a step of receiving the encrypted-image code 4 at the computer 5; (S7) a step of decoding, at the computer 5, the encrypted-image code 4 by using a method used for entropy coding, thus generating a received encrypted image 6; (S8) a step of decrypting and preparing the encryption key image 2, which is encrypted in advance, is separately delivered, and is used in the encryption step; and (S9) a digital-image restoring step of restoring, from the encryption key image 2 and the received encrypted image 6, the digital image 1, which is the maximum likelihood of the received encrypted image 6. In FIG. 1, the steps S1 to S5 are performed at a transmitting side, and the steps S6 to S9 are performed at a receiving side. The network 7 can be any of a LAN (Local Area Network), the Internet, and a dedicated line, and the encrypted-image code 4 is transmitted by a method conforming to the protocol of the network 7.

In the present invention, as the entropy code, the Huffman code used for JPEG is used for images, and an arithmetic code used for MPEG2 and H.264 and variable-length code that is an improved form of the Huffman code are used for video.

In the present invention, although the pixel size and the image size of the encryption key image 2 must be the same as those of the digital image 1, the encryption key image 2 is always a grayscale image. Thus, in the present invention, the encryption key image is prepared by selecting one image from a plurality of encryption key images prepared in advance and is further matched, in terms of image size, to the digital image 1 in the encryption step.

Figure 2:
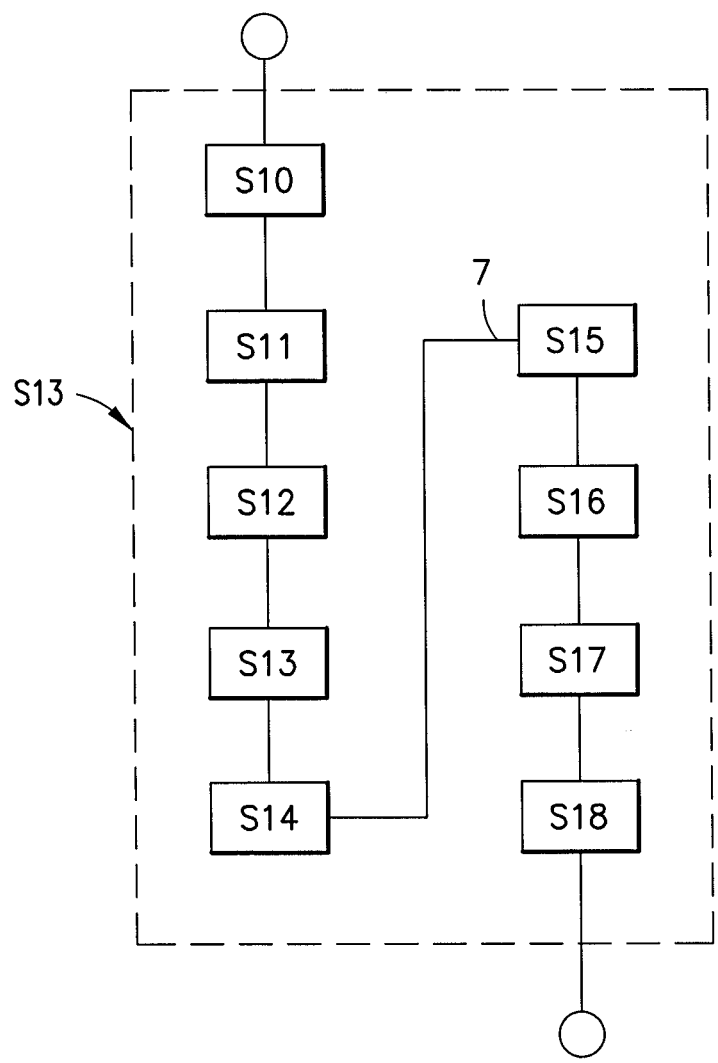
FIG. 2 is a flowchart showing an example procedure in an encryption step according to a second invention of the present invention.

FIG. 2 is a flowchart showing an example procedure in the encryption step S3 according to a second invention of the present invention. The encryption step S3 shown in FIG. 2 is characterized by including: (S10) a first correction step of correcting the encryption key image 2 such that the image size of the encryption key image 2 is matched to that of the digital image 1, thus generating a first corrected encryption key image 8; (S11) a step of subjecting the first corrected encryption key image 8 to Fourier transformation, thus generating a first-corrected-encryption-key-image spectrum 9; (S12) a step of subjecting the digital image 1 to de-gamma correction and then dividing the digital image 1 into a red-primary-color image RI, a green-primary-color image GI, and a blue-primary-color image BI; (S13) a step of subjecting RI, GI, and BI to Fourier transformation, thus generating an RI spectrum RIS, a GI spectrum GIS, and a BI spectrum BIS; (S14) a step of multiplying the RI spectrum RIS by the first-corrected-encryption-key-image spectrum 9 and setting the thus-obtained product as an RIE spectrum RIES; (S15) a step of multiplying the GI spectrum GIS by the first-corrected-encryption-key-image spectrum 9 and setting the thus-obtained product as a GIE spectrum GIES; (S16) a step of multiplying the BI spectrum BIS by the first-corrected-encryption-key-image spectrum 9 and setting the thus-obtained product as a BIE spectrum BIES; (S17) a step of subjecting the RIE spectrum RIES, the GSE spectrum GIES, and the BIE spectrum BIES to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and (S18) a step of combining RE, GE, and BE into a single color image 10 and subjecting the color image 10 to gamma correction, thus generating the encrypted image 3.

In the encryption step S3, according to the following formulae (1) and (2), the digital image 1 and the encryption key image 2 are subjected to Fourier transformation and are subjected to convolution by obtaining the product of them in a frequency space, and a result C of convolution is subjected to inverse Fourier transformation, thereby obtaining D, which is the encrypted image 3.

$$\mathrm{DFT}(A)\cdot\mathrm{DFT}(B)=C \quad (1)$$

$$\mathrm{IDFT}(F1)=D \quad (2)$$

In formula (1) and (2), A indicates the digital image 1, B indicates the encryption key image 2, C indicates the result of convolution, D indicates the encrypted image 3, DFT( ) indicates the discrete Fourier transform, and IDFT( ) indicates the inverse discrete Fourier transform. In the present invention, images have limited sizes, and thus the discrete Fourier transform and the inverse discrete Fourier transform are used.

Through the convolution in the encryption step S3, the high-frequency region of the digital image 1 is removed, information itself is compressed, and recognition is disabled when viewed by a person, thereby achieving encryption. Because the image size and the pixel size remain the same even after the encryption step S3, the amount of data itself is not changed when the digital image 1 is viewed in BMP or DIB format; however, after that, entropy coding (lossless compression) is applied, thus completing the encryption compression. The amount of data in the digital image 1 at the time of completion of the encryption compression depends on the encryption key image 2 but is roughly 30%, which is almost the same as the compression ratio in the JPEG method.

Figure 3:
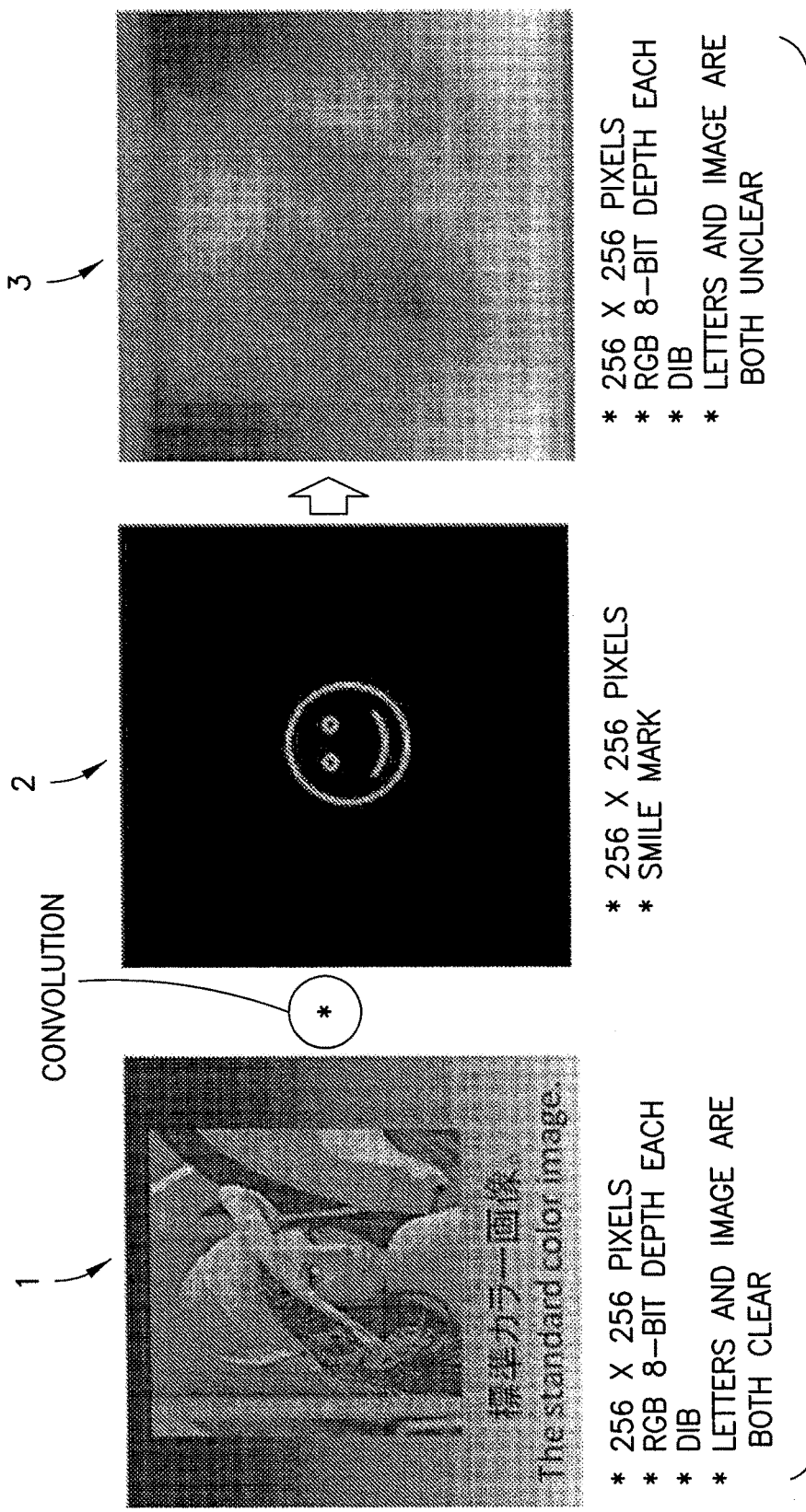
FIG. 3 is a view showing how an encrypted image is generated from an example digital image and an example encryption key image, in the present invention.

FIG. 3 shows how the encrypted image 3 is generated from an example of the digital image 1 and an example of the encryption key image 2. FIG. 3 shows, from the left, an example of the digital image 1, an example of the encryption key image 2, and the encrypted image 3 on the right. As is clear from the example shown in FIG. 3, letters and an image are both clear in the digital image 1, whereas the letters and the image are both unclear in the encrypted image 3 generated in the encryption step S3, which can be called an appropriate encrypted image. Encryption in the present invention means generation of an extremely unclear image, as in the example.

The encryption strength of the encryptioh key image 2 varies depending on the image design. For example, in a case of a design in which the color of the background is black (0 bits in 8-bit brightness are turned on), the color of the center of a circular disk, the center also serving as the center of the encryption key image 2, is white (all 8 bits in 8-bit brightness are turned on), and the color is gradually changed to black as the distance from the center is increased, the encryption strength becomes stronger as the radius of the circular disk becomes larger. In addition, irrespective of the encryption strength, the encryption key image 2 can be any design as long as it is located at the center of the image and is not deviated; also, the design does not need to be point-symmetric, and it is possible to use, for example, a company logo, a letter string, a character, a diamond, a spade, a heart, a circular ring, a circle, a rhombus, a polygon with three or more vertices, etc. Those graphics may be painted with gradation.

Figure 4:
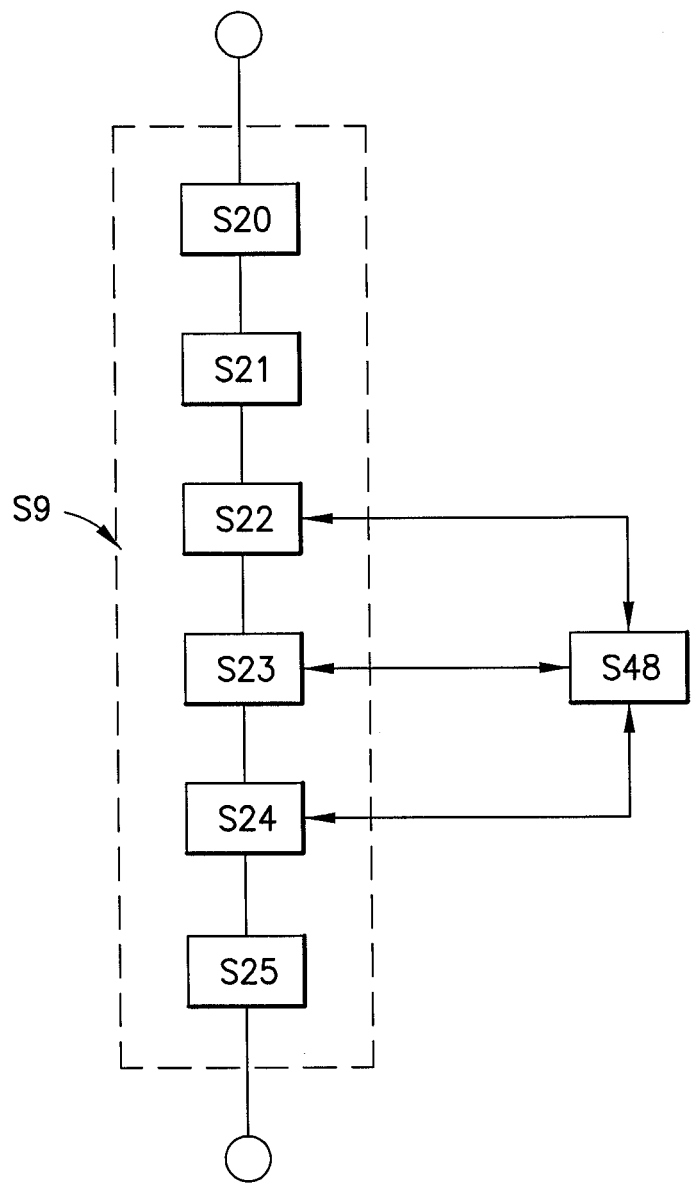
FIG. 4 is a flowchart showing an example procedure in a digital-image restoring step according to a third invention of the present invention.

FIG. 4 is a flowchart showing an example procedure of the digital-image restoring step S9 according to a third invention of the present invention. The image restoring step S9 shown in FIG. 4 is characterized by including: (S20) a second correction step of correcting the encryption key image 2 such that the image size of the encryption key image 2 is matched to that of the received encrypted image 6, thus generating a second corrected encryption key image 11; (S21) a step of dividing the received encrypted image 6 into a red-primary-color image 12, a green-primary-color image 13, and a blue-primary-color image 14; (S22) a step of setting the second corrected, encryption key image 11 as an H image 15, setting the red-primary-color image 12 as a Y image 16, restoring an F image 17 by using an image-restoration calculation step S48 in which the F image 17 is restored from the H image 15 and the Y image 16, and setting this F image 17 as a red-primary-color digital image 18; (S23) a step of setting the green-primary-color image 13 as a Y image 16, restoring an F image 17 by using the image-restoration calculation step S48, and setting this F image 17 as a green-primary-color digital image 19; (S24) a step of setting the blue-primary-color image 14 as a Y image 16, restoring an F image 17 by using the image-restoration calculation step S48, and setting this F image 17 as a blue-primary-color digital image 20; and (S25) a step of combining the red-primary-color digital image 18, the green-primary-color digital image 19, and the blue-primary-color digital image 20 into a maximum-likelihood digital image 21.

The red-primary-color image 12, the green-primary-color image 13, the blue-primary-color image 14, and the maximum-likelihood digital image 21 have the same pixel size and image size as the received encrypted image 6.

Figure 5:
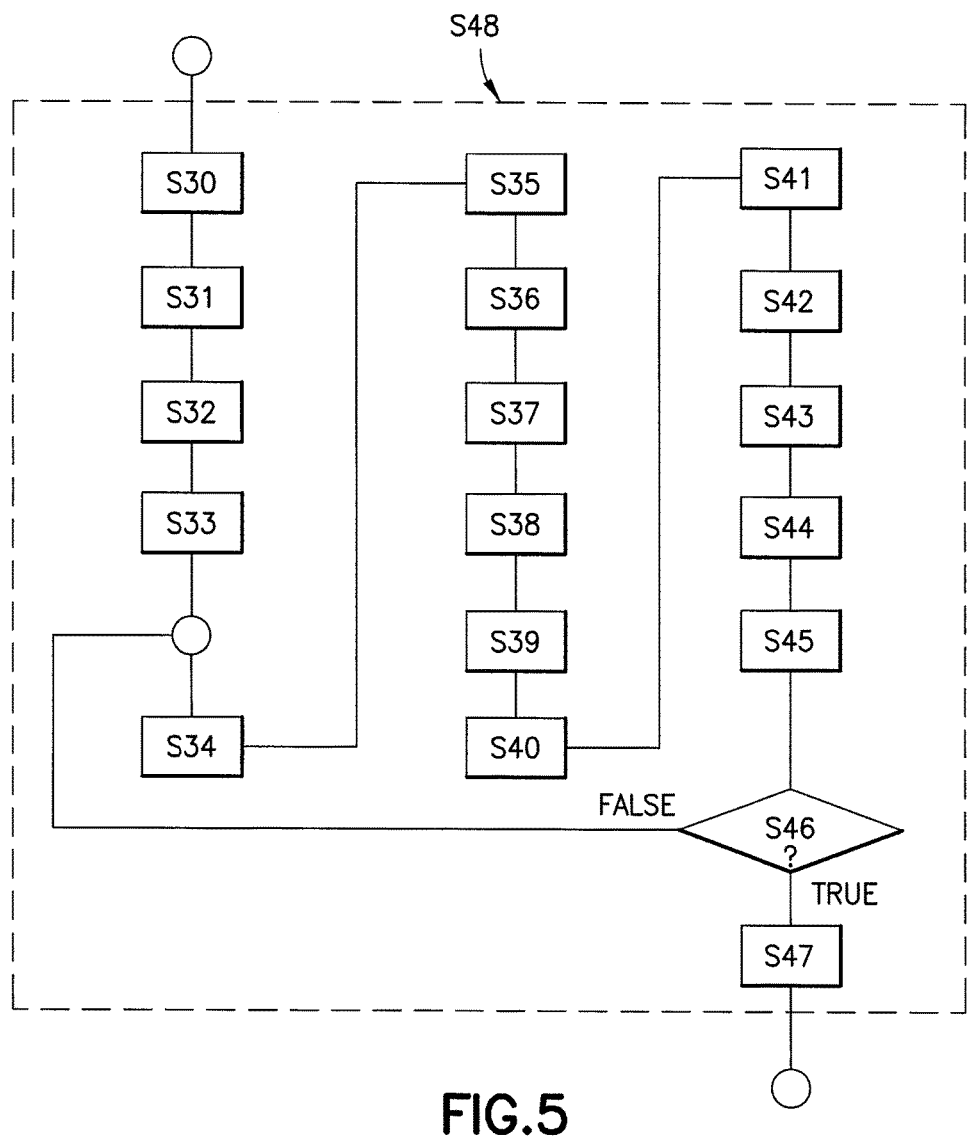
FIG. 5 is a flowchart showing an example procedure in an image-restoration calculation step according to a fourth invention of the present invention.

FIG. 5 is a flowchart showing an example procedure of the image-restoration calculation step S48, according to a fourth invention of the present invention. The image-restoration calculation step S48 shown in FIG. 5 is characterized by including: (S30) a step of subjecting the H image 15 to Fourier transformation, thus obtaining an H-image spectrum 22; (S31) a step of setting the maximum number of iterative operations 23; (S32) a step of setting a counter for counting the number of iterative operations to 0, thus resetting the counter; (S33) a step of subjecting the Y image 16 to de-gamma correction, thus obtaining the Y image 16, and of setting the Y image 16 to F-image initial values 24; (S34) a step of subjecting the F-image initial values 24 to Fourier transformation, thus obtaining an F-image initial-value spectrum 25; (S35) a step of multiplying the F-image initial-value spectrum 25 by the H-image spectrum 22 and setting the thus-obtained product as a first function F1; (S36) a step of inverting the first function F1, thus generating a second function F2; (S37) a step of multiplying the Y image 16 by the second function F2 and setting the thus-obtained product as a third function F3; (S38) a step of subjecting the third function F3 to Fourier transformation, thus obtaining a third-function spectrum 26; (S39) a step of obtaining a reversal function of the H image 15 and setting the obtained function as a fourth function F4; (S40) a step of subjecting the fourth function F4 to Fourier transformation, thus obtaining a fourth-function spectrum 27; (S41) a step of multiplying the third-function spectrum 26 by the fourth-function spectrum 27 and setting the thus-obtained product as a fifth function F5; (S42) a step of subjecting the fifth function F5 to inverse Fourier transformation, thus obtaining a sixth function F6; (S43) a step of multiplying the sixth function F6 by the F-image initial values 24 and setting the thus-obtained product as an F image 17; (S44) a step of setting the F image 17 to F-image initial values 24; (S45) a step of adding 1 to the counter; (S46) a step of verifying a hypothesis in which the value n of the counter exceeds the maximum number of iterative operations 23, returning to step S34 if the verification result is false, and advancing to step S47 if the verification result is true; and (S47) a step of subjecting the F image 17 to gamma correction, thus obtaining an F image 17, and of outputting the F image 17.

In the image-restoration calculation step S48, calculation is performed on the basis of Formula (3), a predetermined number of iterative operations is performed to estimate, from the H image 15, the Y image 16, and the F-image initial values 24 that are formed of the Y image 16, the distribution of the F image 17 that has the maximum likelihood of the distribution of the Y image 16. Formula (3) is obtained for the present invention by rewriting Formula (15) described in Patent Registration No. 4568730, which was invented by the inventor of the present invention and was registered.

{Expression 1}

$$F_{k+1} = F_k \cdot \mathcal{F}^{-1}\left\{\mathcal{F}\left(\frac{Y}{\mathcal{F}^{-1}(\mathcal{F}(F_k) \cdot \mathcal{F}(H))}\right) \cdot \mathcal{F}(H^{\#})\right\} \quad (3)$$

In Formula (3), F( ) indicates the discrete Fourier transform, $F^{-1}$( ) indicates the inverse discrete Fourier transform, F indicates an F image, the index k on F indicates F-image initial values in the (k+1)-th iterative operation, the index k+1 on F indicates an F image in the (k+1)-th iterative operation and F-image initial values in the (k+2)-th iterative operation, Y indicates an Y image, H indicates an H image, and H with an index # indicates an H-image reversal function. Furthermore, k is an integer equal to or greater than 0.

Because it is known that the H image has been used at the time of encryption and is correct, the F-image initial values can be anything, and thus, in the present invention, on the assumption that the distribution of the Y image differs little from the distribution of the F image, the Y image is used for the F-image initial values, with the aim of achieving early convergence.

Figure 6:
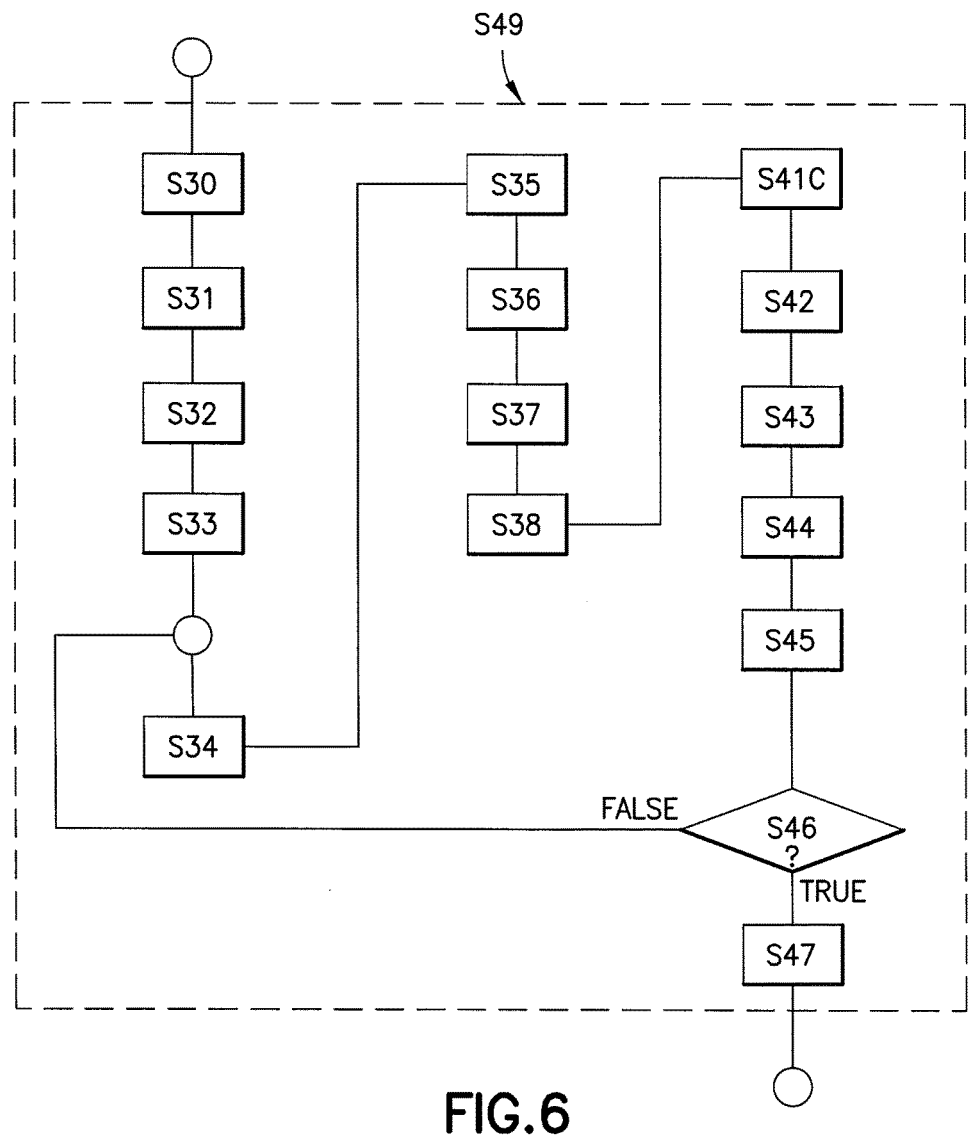
FIG. 6 is a flowchart showing an example procedure in a second aspect of the image-restoration calculation step, according to a fifth invention of the present invention.

FIG. 6 is a flowchart showing an example procedure of a second aspect S49 of the image-restoration calculation step S48, according to a fifth invention of the present invention. The second aspect S49 of the image-restoration calculation step S48 shown in FIG. 6 is characterized in that a point-symmetric image is used as the encryption key image 2 in the image-restoration calculation step S48 according to the fourth invention, thereby eliminating the steps S39 and S40 and changing the step S41 to (S41C) a step of multiplying the third-function spectrum 26 by the H-image spectrum 22 and of setting the thus-obtained product as the fifth function F5. This is because the H image 15 is the encryption key image 2, and the reversal function of the H image 15 is the H image 15 if the encryption key image 2 is point symmetric; therefore, steps S39 and S40 are unnecessary and can thus be omitted, and, in step S41C, the fourth-function spectrum 26 is directly multiplied by the H-image spectrum 22, to obtain the product, i.e., the fifth function F5. Thus, steps S39 to S41 in the image-restoration calculation step S48 can be substituted by step S41C.

Figure 7:
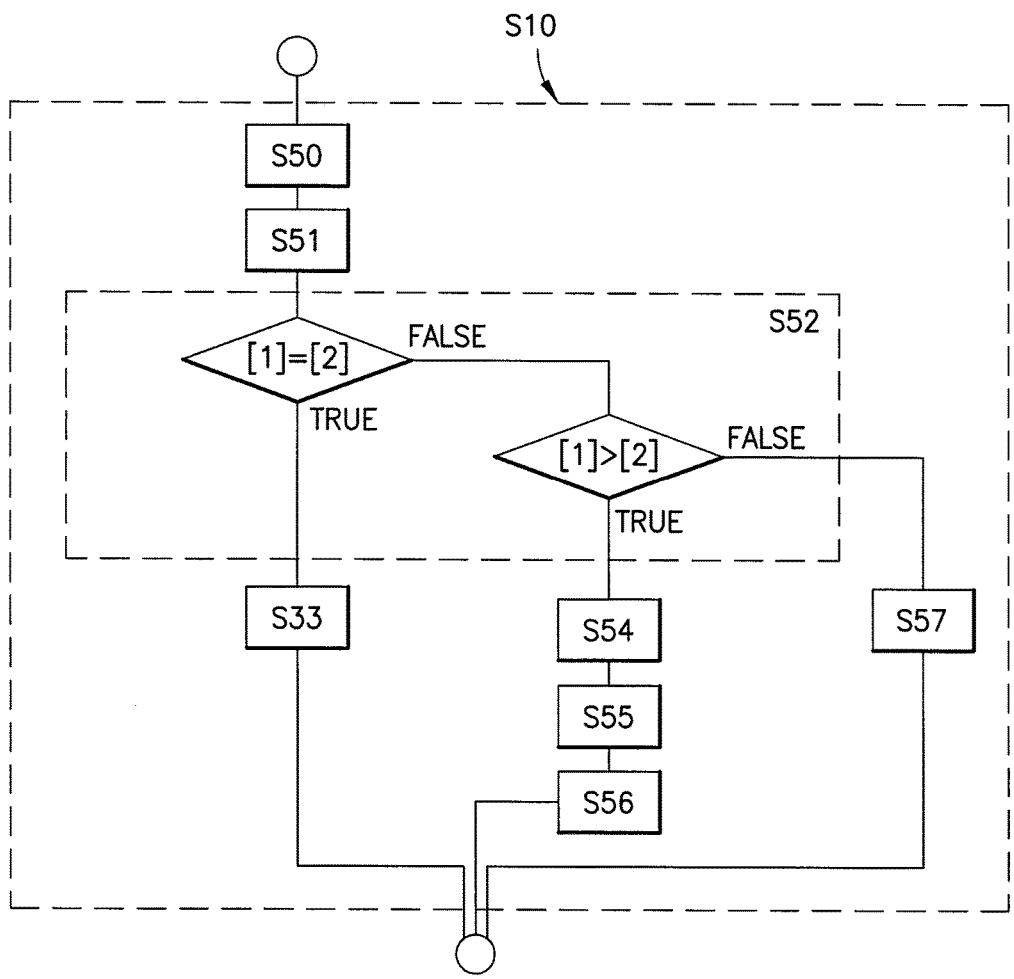
FIG. 7 is a flowchart showing an example procedure in a first correction step according to a sixth invention of the present invention.

FIG. 7 is a flowchart showing an example procedure in the first correction step S10 according to a sixth invention of the present invention. The first correction step S10 shown in FIG. 7 is characterized by including: (S50) a step of matching the pixel size of the encryption key image 2 to the pixel size of the digital image 1; (S51) a step of preparing the first corrected encryption key image 8 having the same image size as the digital image 1 and no data; (S52) a step of comparing the image size of the encryption key image 2 with the image size of the digital image 1, advancing to step (S53) if they are equal to each other, advancing to step (S54) if the image size of the encryption key image 2 is smaller than the image size of the digital image 1, and advancing to step (S57) otherwise; (S53) a step of transferring the encryption key image 2 to the first corrected encryption key image 8 and then ending the first correction step; (S54) a step of moving the encryption key image 2 such that the coordinates of the center pixel of the encryption key image 2 are matched to the coordinates of the center pixel of the first corrected encryption key image 8; (S55) a step of transferring the encryption key image 2 to the first corrected encryption key image 8; (S56) a step of transferring pixels in a transferred area of the first corrected encryption key image 8 to a non-transferred area thereof by using boundaries between the transferred area and the non-transferred area as mirror inversion axes, and then ending the first correction step; and (S57) a step of reducing the encryption key image 2 so as to be matched to the image size of the digital image 1, transferring the reduced encryption key image 2 to the first corrected encryption key image 8, and then ending the first correction step.

Figure 8:
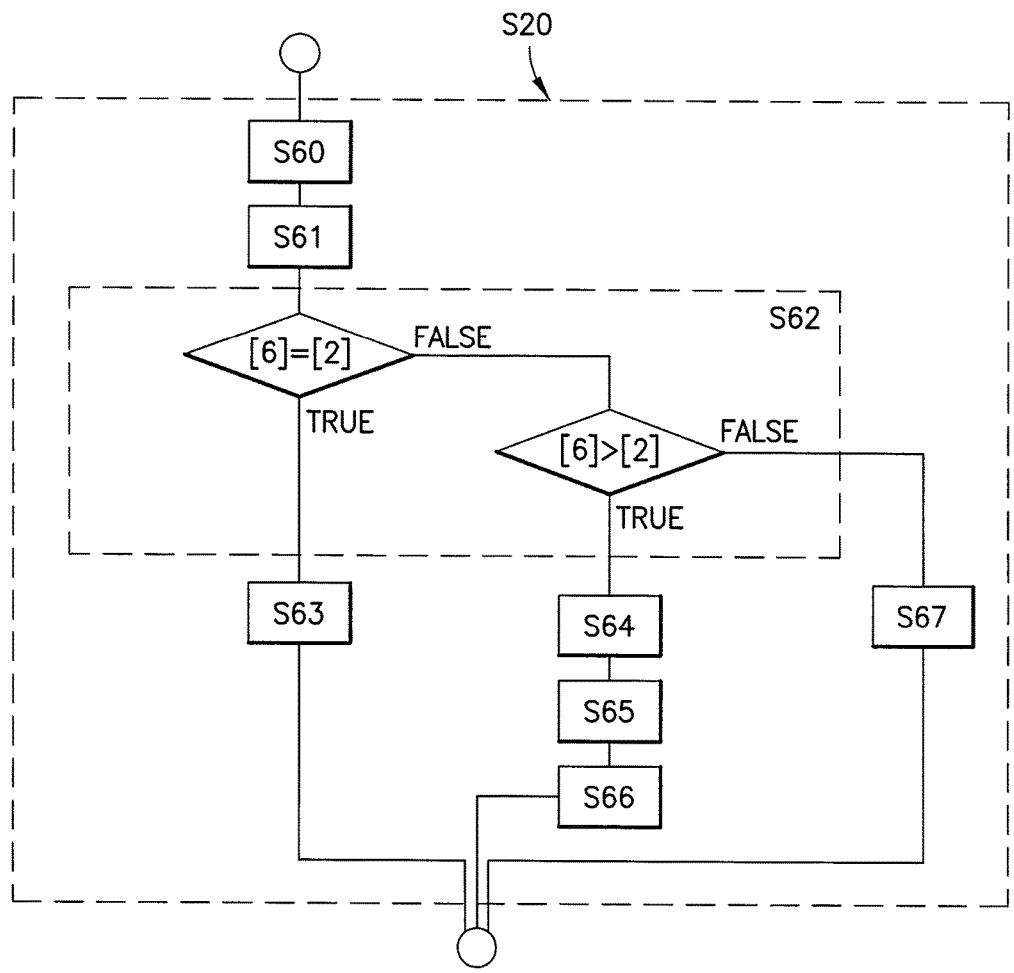
FIG. 8 is a flowchart showing an example procedure in a second correction step according to a seventh invention of the present invention.

FIG. 8 is a flowchart showing an example procedure in the second correction step S20 according to a seventh invention of the present invention. The second correction step S20 shown in FIG. 8 is characterized by including: (S60) a step of matching the pixel size of the encryption key image 2 to the pixel size of the received encrypted image 6; (S61) a step of preparing the second corrected encryption key image 11 having the same image size as the received encrypted image 6 and no data; (S62) a step of comparing the image size of the encryption key image 2 with the image size of the received encrypted image 6, advancing to step (S63) if they are equal to each other, advancing to step (S64) if the image size of the encryption key image 2 is smaller than the image size of the received encrypted image 6, and advancing to step (S67) otherwise; (S63) a step of transferring the encryption key image 2 to the second corrected encryption key image 11 and then ending the second correction step; (S64) a step of moving the encryption key image 2 such that the coordinates of the center pixel of the encryption key image 2 are matched to the coordinates of the center pixel of the second corrected encryption key image 11; (S65) a step of transferring the encryption key image 2 to the second corrected encryption key image 11; (S66) a step of transferring pixels in a transferred area of the second corrected encryption key image 11 to a non-transferred area thereof by using the boundaries between the transferred area and the non-transferred area as mirror inversion axes, and then ending the second correction step; (S67) a step of reducing the encryption key image 2 so as to be matched to the image size of the received encrypted image 6, transferring the reduced encryption key image 2 to the second corrected encryption key image 11, and then ending the second correction step.

The steps S52 and S62 can be written by using switch case statement in C++, for example.

A first program 34, which is an example of the present invention, is used to carry out all steps in a first aspect of the cryptographic-communication image compressing/expanding method of the first invention, which includes the encryption step S3 of the second invention, the digital-image restoring step S9 of the third invention, the image-restoration calculation step S48 of the fourth invention, the first correction step S10 of the sixth invention, and the second correction step S20 of the seventh invention.

A second program 35, which is an example of the present invention, is used to carry out all steps in a second aspect of the cryptographic-communication image compressing/expanding method of the first invention, which includes the encryption step S3 of the second invention, the digital-image restoring step S9 of the third invention, the second aspect S49 of the image-restoration calculation step of the fifth invention, the first correction step S10 of the sixth invention, and the second correction step S20 of the seventh invention.

The first program and the second program are written in the Visual C++ language; however, the programs may be partially written in XML or JAVA (registered trademark), or the programs may be written in a combination of C, C+, HTTP, XML, and JAVA (registered trademark).

A first storage medium according to a tenth invention of the present invention stores the first program of an eighth invention in an encrypted state, can be connected to a computer, and can be read by the computer. The first storage medium may contain an encryption/decryption circuit or may merely store encrypted data after the computer connected thereto performs encryption/decryption. When the first storage medium contains the encryption/decryption circuit, a USB flash memory, an SD memory card, etc., can be used. A USB flash memory is used as the first storage medium. When the first storage medium merely stores encrypted data, any one of a USB flash memory, an SD memory card, a CD (Compact Disk), and a DVD (Digital Versatile Disk) can be used.

A second storage medium according to an eleventh invention of the present invention stores the second program of a ninth invention in an encrypted state, can be connected to a computer, and can be read by the computer. The same storage medium as the first storage medium is used as the second storage medium. Although the same storage medium as the first storage medium can be used as the second storage medium, a desired one can be selected from an SD memory card, a CD, a DVD, etc.

Figure 9:
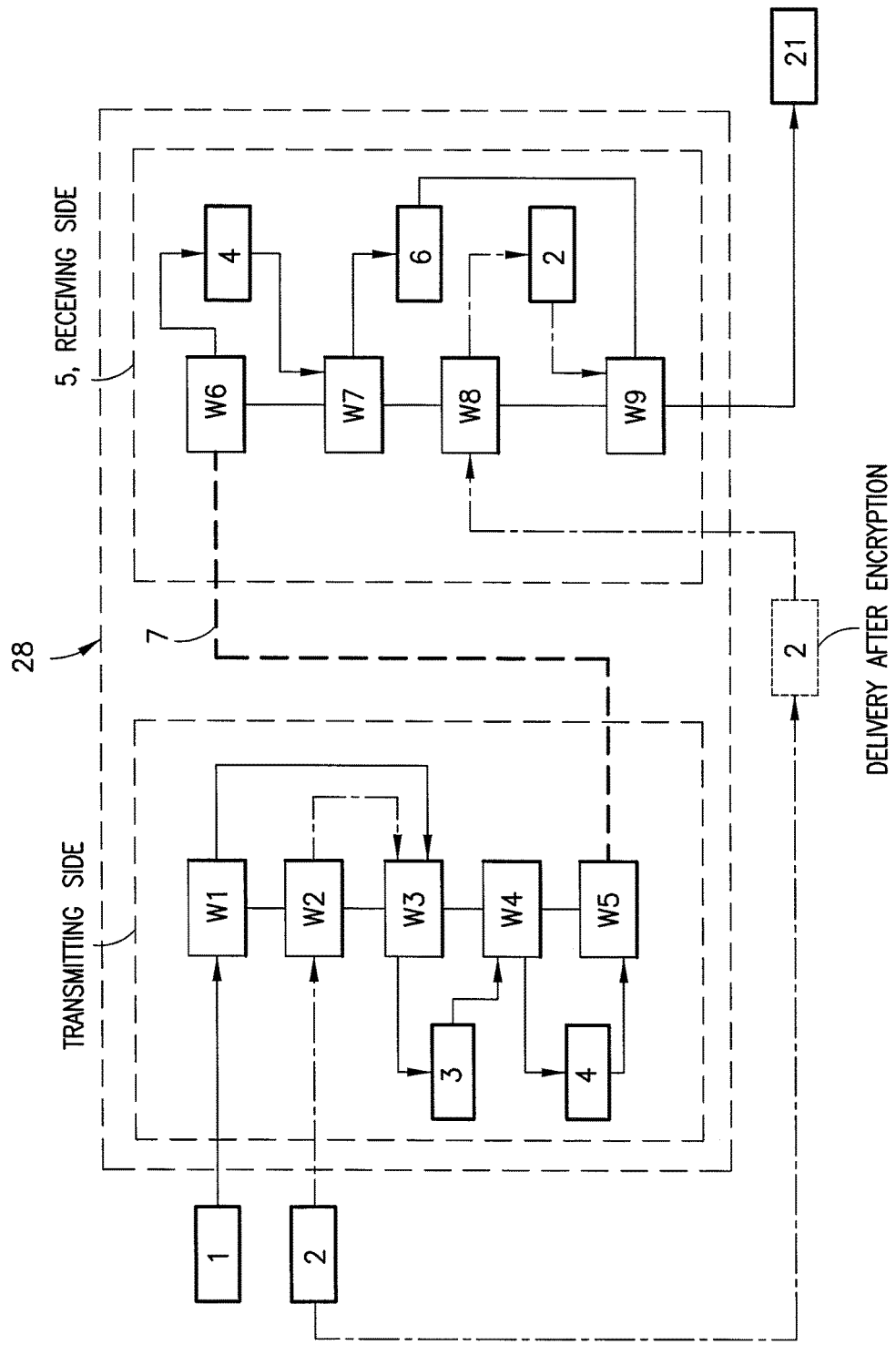
FIG. 9 is a diagram showing an example configuration of a cryptographic-communication image compressing/expanding device according to a twelfth invention of the present invention.

FIG. 9 is a diagram showing an example configuration of a cryptographic-communication image compressing/expanding device 28 according to a twelfth invention of the present invention. The cryptographic-communication image compressing/expanding device 28 shown in FIG. 9 is characterized by including: (W1) an image retrieving means for retrieving a digital image 1; (W2) a means for preparing a grayscale encryption key image 2 with a desired encryption strength; (W3) an encryption means for subjecting the digital image 1 to convolution with the encryption key image 2, to remove high-frequency components in the digital image 1, to reduce the resolution thereof, and to encrypt the digital image 1, thus obtaining an encrypted image 3; (W4) a means for subjecting the encrypted image 3 to entropy coding, thus converting the encrypted image 3 into encrypted-image code 4; (W5) a means for transmitting the encrypted-image code 4 to another computer 5 on the network 7; (W6) a means for receiving the encrypted-image code 4 at the computer 5; (W7) a means for decoding, at the computer 5, the encrypted-image code 4 by using a decoding method corresponding to encoding used to perform entropy coding, thus generating a received encrypted image 6; (W8) a means for decrypting and preparing the encryption key image 2, which is encrypted in advance, is separately delivered, and is used in the encryption means; (W9) a digital-image restoring means for restoring, from the encryption key image 2 and the received encrypted image 6, a maximum-likelihood digital image 21 that has the maximum likelihood of the received encrypted image 6.

In FIG. 9, the encryption key image 2 used in the encryption means W3 is separately encrypted (shown in a dotted-line box in the figure) and is delivered in advance to a computer, such as the computer 5, on the network 7, such as the Internet or a LAN. This encryption method may be an encryption method contained in a common key system, a private key system, or a ZIP file. In order to maintain the security, the encryption key image 2 can be periodically replaced with one of appropriate encryption key images in a library.

Figure 10:
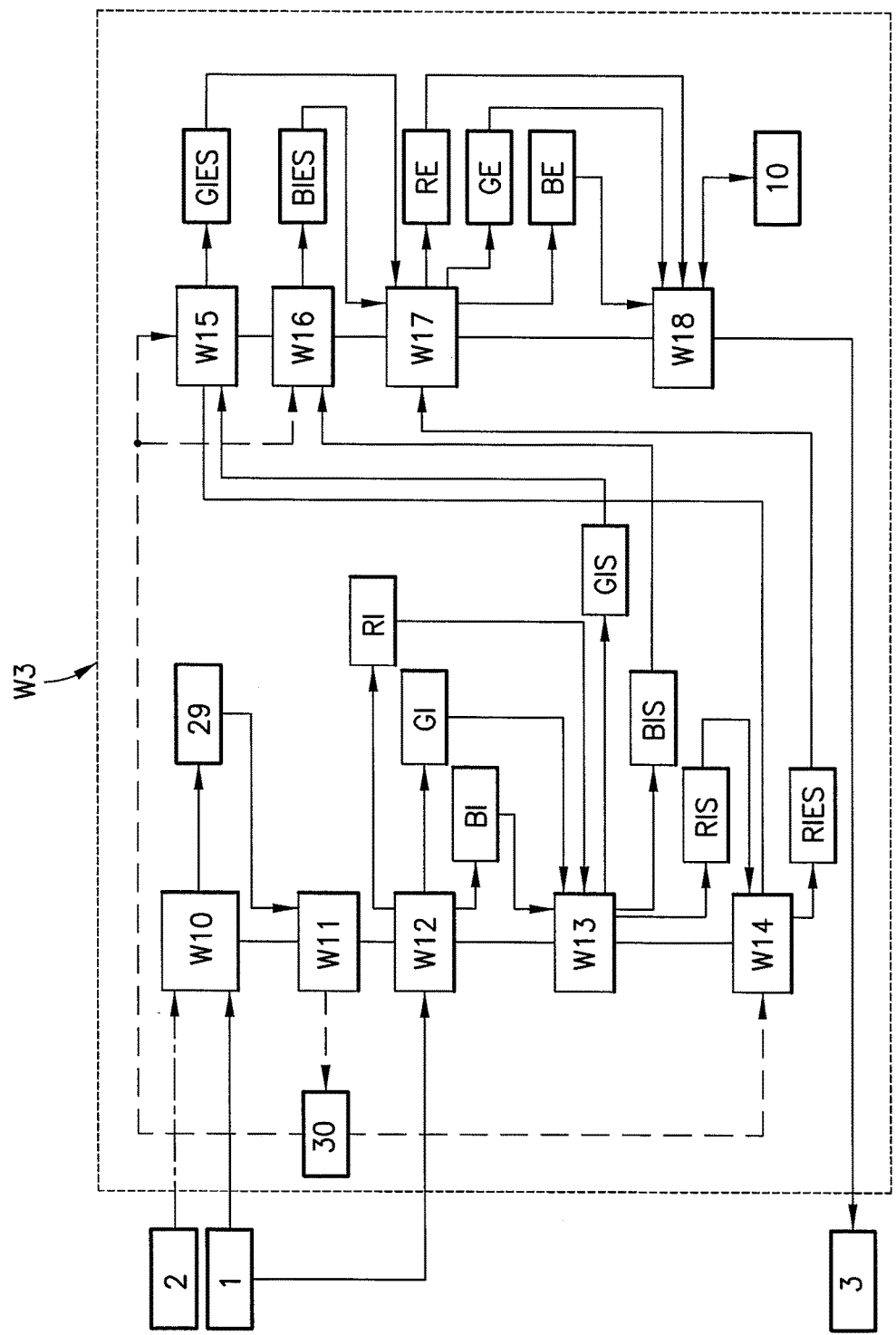
FIG. 10 is a diagram showing an example configuration of an encryption means according to a thirteenth invention of the present invention.

FIG. 10 is a diagram showing an example configuration of the encryption means W3 according to a thirteenth invention of the present invention. The encryption means W3 shown in FIG. 10 is characterized by including: (W10) a first correction means for correcting the encryption key image 2 such that the image size of the encryption key image 2 is matched to that of the digital image 1, thus generating a third corrected encryption key image 29; (W11) a means for subjecting the third corrected encryption key image 29 to Fourier transformation, thus generating a third-corrected-encryption-key-image spectrum 30; (W12) a means for subjecting the digital image 1 to de-gamma correction and then dividing the digital image 1 into a red-primary-color image RI, a green-primary-color image GI, and a blue-primary-color image BI; (W13) a means for subjecting RI, GI, and BI to Fourier transformation, thus generating an RI spectrum RIS, a GI spectrum GIS, and a BI spectrum BIS; (W14) a means for multiplying the RI spectrum RIS by the third-corrected-encryption-key-image spectrum 30 and setting the thus-obtained product as an RIE spectrum RIES; (W15) a means for multiplying the GI spectrum GIS by the third-corrected-encryption-key-image spectrum 30 and setting the thus-obtained product as a GIE spectrum GIES; (W16) a means for multiplying the BI spectrum BIS by the third-corrected-encryption-key-image spectrum 30 and setting the thus-obtained product as a BIE spectrum BIES; (W17) a means for subjecting the RIE spectrum RIES, the GIE spectrum GIES, and the BIE spectrum BIES to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and (W18) a means for combining RE, GE, and BE into a single color image 10 and subjecting the color image 10 to gamma correction, thus generating the encrypted image 3.

Figure 11:
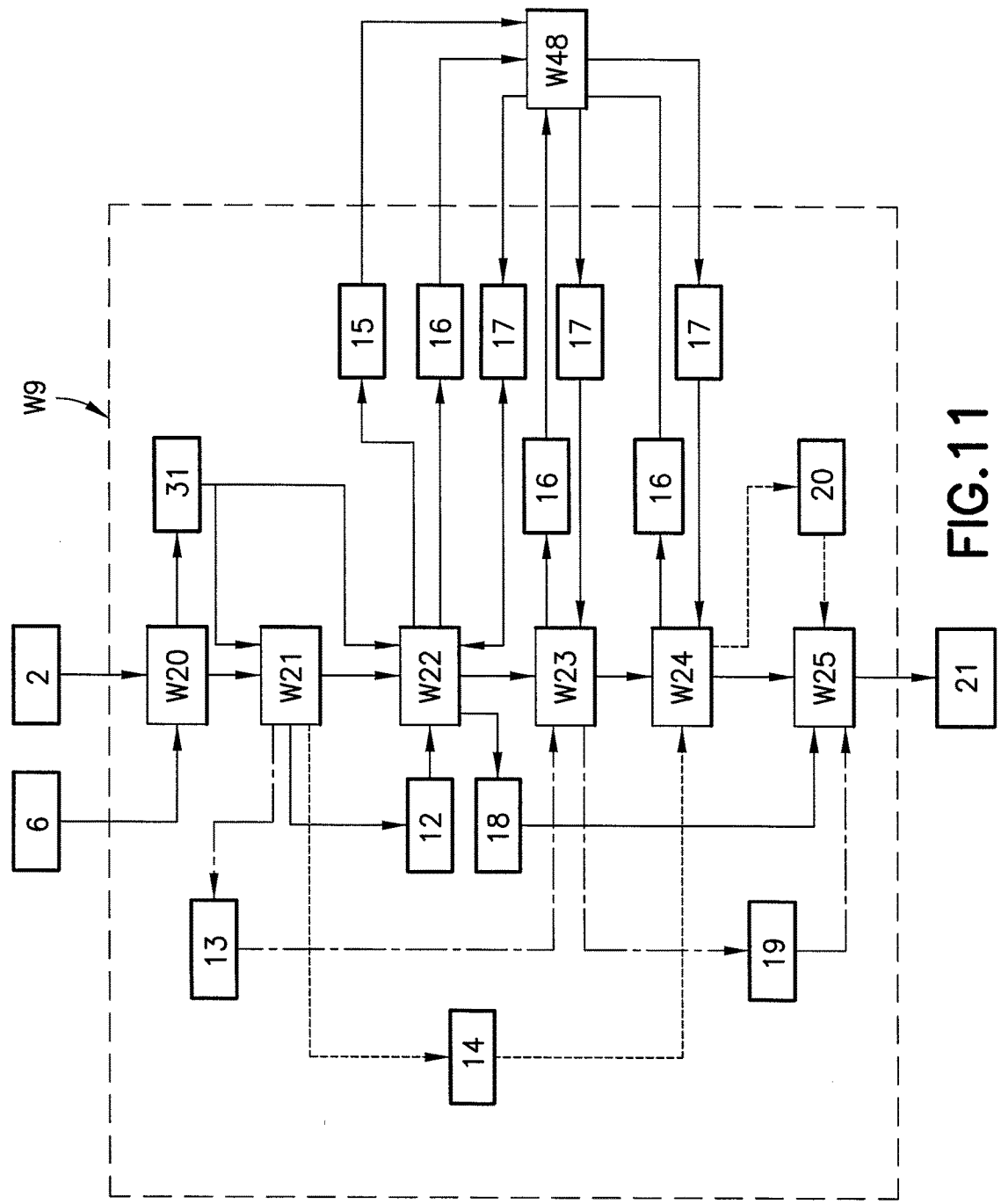
FIG. 11 is a diagram showing an example configuration of a digital-image restoring means according to a fourteenth invention of the present invention.

FIG. 11 is a diagram showing an example configuration of the digital-image restoring means W9 according to a fourteenth invention of the present invention. The digital-image restoring means W9 shown in FIG. 11 is characterized by including: (W20) a second correction means for correcting the encryption key image 2 such that the image size of the encryption key image 2 is matched to that of the received encrypted image 6, thus generating a fourth corrected encryption key image 31; (W21) a means for dividing the received encrypted image 6 into a red-primary-color image 12, a green-primary-color image 13, and a blue-primary-color image 14; (W22) a means for setting the fourth corrected encryption key image 31 as an H image 15, setting the red-primary-color image 12 as a Y image 16, restoring an F image 17 by using an image-restoration calculation means W48 in which the F image is restored from the H image 15 and the Y image 16, and setting the F image 17 as a red-primary-color digital image 18; (W23) a means for setting the green-primary-color image 13 as a Y image 16, restoring an F image 17 by using the image-restoration calculation means W48, and setting the F image 17 as a green-primary-color digital image 19; (W24) a means for setting the blue-primary-color image 14 as a Y image 16, restoring an F image 17 by using the image-restoration calculation means W48, and setting the F image 17 as a blue-primary-color digital image 20; and (W25) a means for combining the red-primary-color digital image 18, the green-primary-color digital image 19, and the blue-primary-color digital image 20 into the maximum-likelihood digital image 21.

Figure 12:
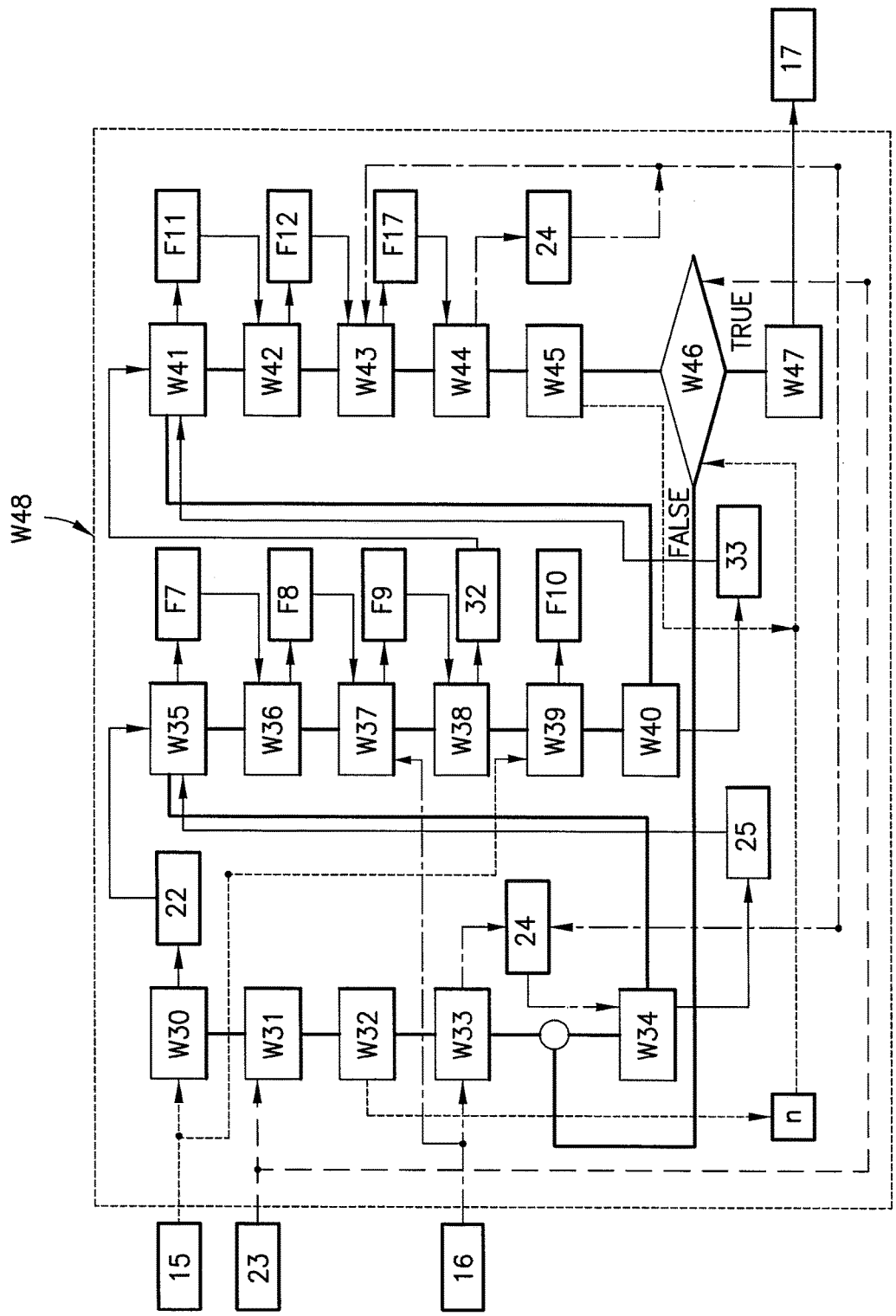
FIG. 12 is a diagram showing an example configuration of an image-restoration calculation means according to a fifteenth invention of the present invention.

FIG. 12 is a diagram showing an example configuration of the image-restoration calculation means W48 according to a fifteenth invention of the present invention. The image-restoration calculation means W48 shown in FIG. 12 is characterized by including: (W30) a means for subjecting the H image 15 to Fourier transformation, thus obtaining an H-image spectrum 22; (W31) a means for setting the maximum number of iterative operations 23; (W32) a means for setting the counter for counting the number of iterative operations to 0, thus resetting the counter; (W33) a means for subjecting the Y image 16 to de-gamma correction, thus generating the Y image 16, and for setting the Y image 16 to the F-image initial values 24; (W34) a means for subjecting the F-image initial values 24 to Fourier transformation, thus obtaining an F-image initial-value spectrum 25; (W35) a means for multiplying the F-image initial-value spectrum 25 by the H-image spectrum 22 and setting the thus-obtained product as a seventh function F7; (W36) a means for inverting the seventh function F7, thus generating an eighth function F8; (W37) a means for multiplying the Y image 16 by the eighth function F8 and setting the thus-obtained product as a ninth function F9; (W38) a means for subjecting the ninth function F9 to Fourier transformation, thus obtaining a ninth-function spectrum 32; (W39) a means for obtaining a reversal function of the H image 15 and setting the obtained function as a tenth function F10; (W40) a means for subjecting the tenth function F10 to Fourier transformation, thus obtaining a tenth-function spectrum 33; (W41) a means for multiplying the ninth-function spectrum 32 by the tenth-function spectrum 33 and setting the thus-obtained product as an eleventh function F11; (W42) a means for subjecting the eleventh function F11 to inverse Fourier transformation, thus obtaining a twelfth function F12; (W43) a means for multiplying the twelfth function F12 by the F-image initial values 24 and setting the thus-obtained product as the F image 17; (W44) a means for setting the F image 17 to the F-image initial values 24; (W45) a means for adding 1 to the counter; (W46) a means for verifying a hypothesis in which the value n of the counter exceeds the maximum number of iterative operations 23, returning to means W34 if the verification result is false, and advancing to step W47 if the verification result is true; and (W47) a means for subjecting the F image 17 to gamma correction, thus obtaining an F image 17, and for outputting the F image 17.

Figure 13:
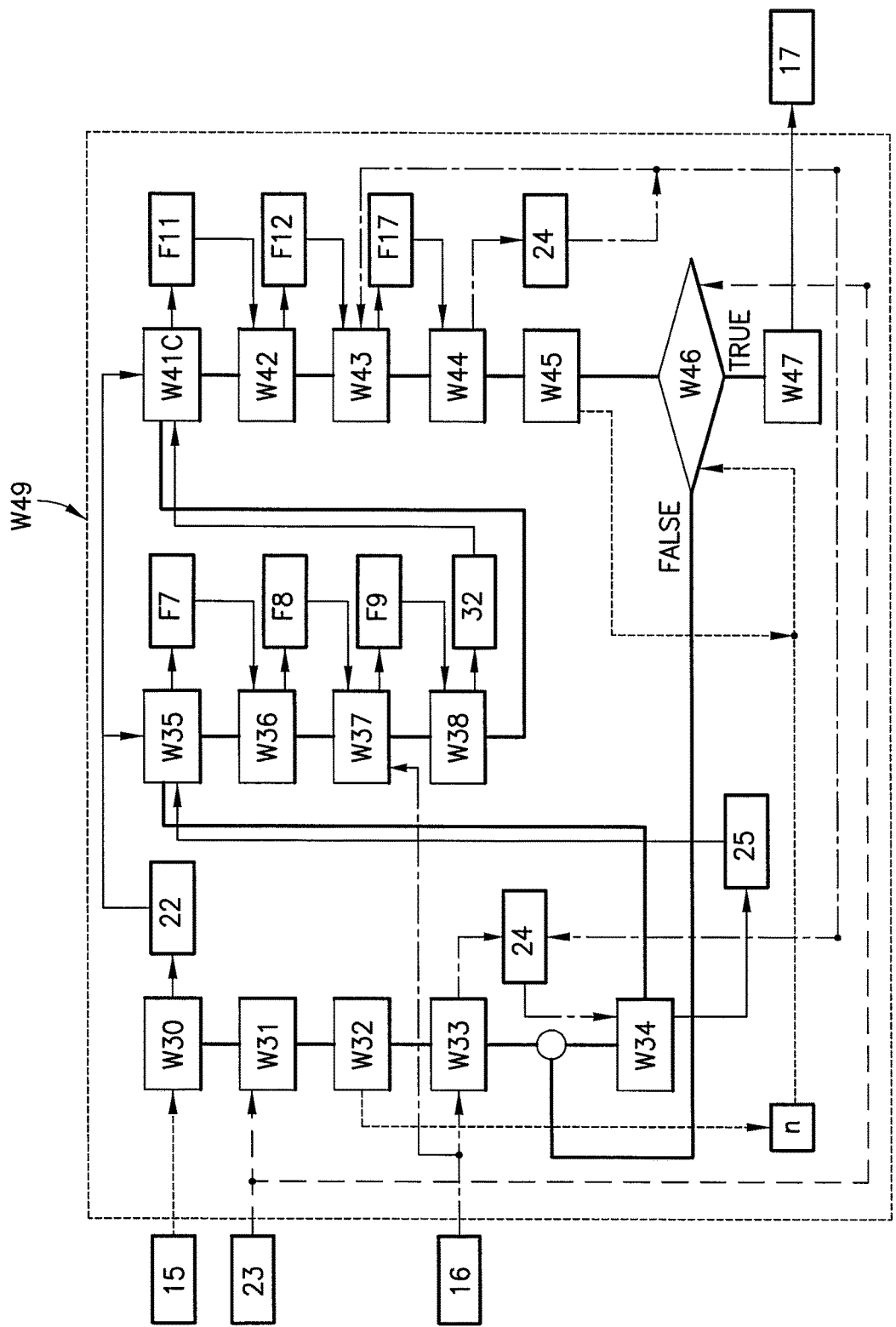
FIG. 13 is a diagram showing an example configuration of a second aspect of the image-restoration calculation means, according to a sixteenth invention of the present invention.

FIG. 13 is a diagram showing an example configuration of a second aspect W49 of the image-restoration calculation means, according to a sixteenth invention of the present invention. The second aspect W49 of the image-restoration calculation means shown in FIG. 13 is characterized in that a point symmetric image is used as the encryption key image 2, thereby eliminating the means W39 and W40 and changing the means W41 to (W41C) a means for multiplying the ninth-function spectrum 32 by the H-image spectrum 22 and setting the thus-obtained product as the eleventh function F11.

Figure 14:
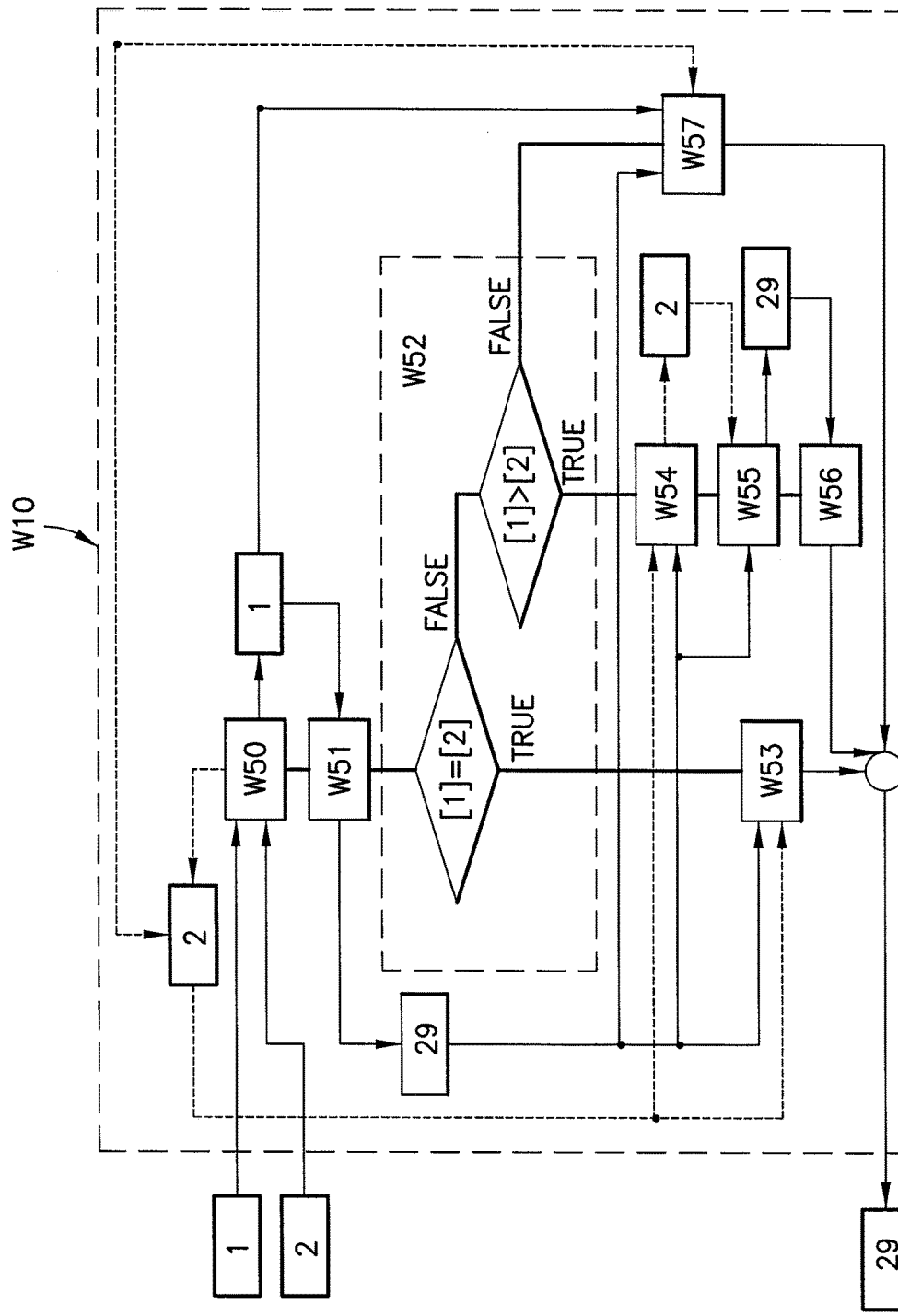
FIG. 14 is a diagram showing an example configuration of a first correction means according to a seventeenth invention of the present invention.

FIG. 14 is a diagram showing an example configuration of the first correction means W10 according to a seventeenth invention of the present invention. The first correction means W10 shown in FIG. 14 is characterized by including: (W50) a means for matching the pixel size of the encryption key image 2 to the pixel size of the digital image 1; (W51) a means for preparing the third corrected encryption key image 29 having the same image size as the digital image 1 and no data; (W52) a means for comparing the image size of the encryption key image 2 with the image size of the digital image 1, advancing to means (W53) if they are equal to each other, advancing to means (W54) if the image size of the encryption key image 2 is smaller than the image size of the digital image 1, and advancing to means (W57) otherwise; (W53) a means for transferring the encryption key image 2 to the third corrected encryption key image 29 and then ending the first correction; (W54) a means for moving the encryption key image 2 such that the coordinates of the center pixel of the encryption key image 2 are matched to the coordinates of the center pixel of the third corrected encryption key image 29; (W55) a means for transferring the encryption key image 2 to the third corrected encryption key image 29; (W56) a means for transferring pixels in a transferred area of the third corrected encryption key image 29 to a non-transferred area thereof by using the boundaries between the transferred area and the non-transferred area as mirror inversion axes, and then ending the first correction; and (W57) a means for reducing the encryption key image 2 so as to be matched to the image size of the digital image 1, transferring the reduced encryption key image 2 to the third corrected encryption key image 29, and then ending the first correction.

Figure 15:
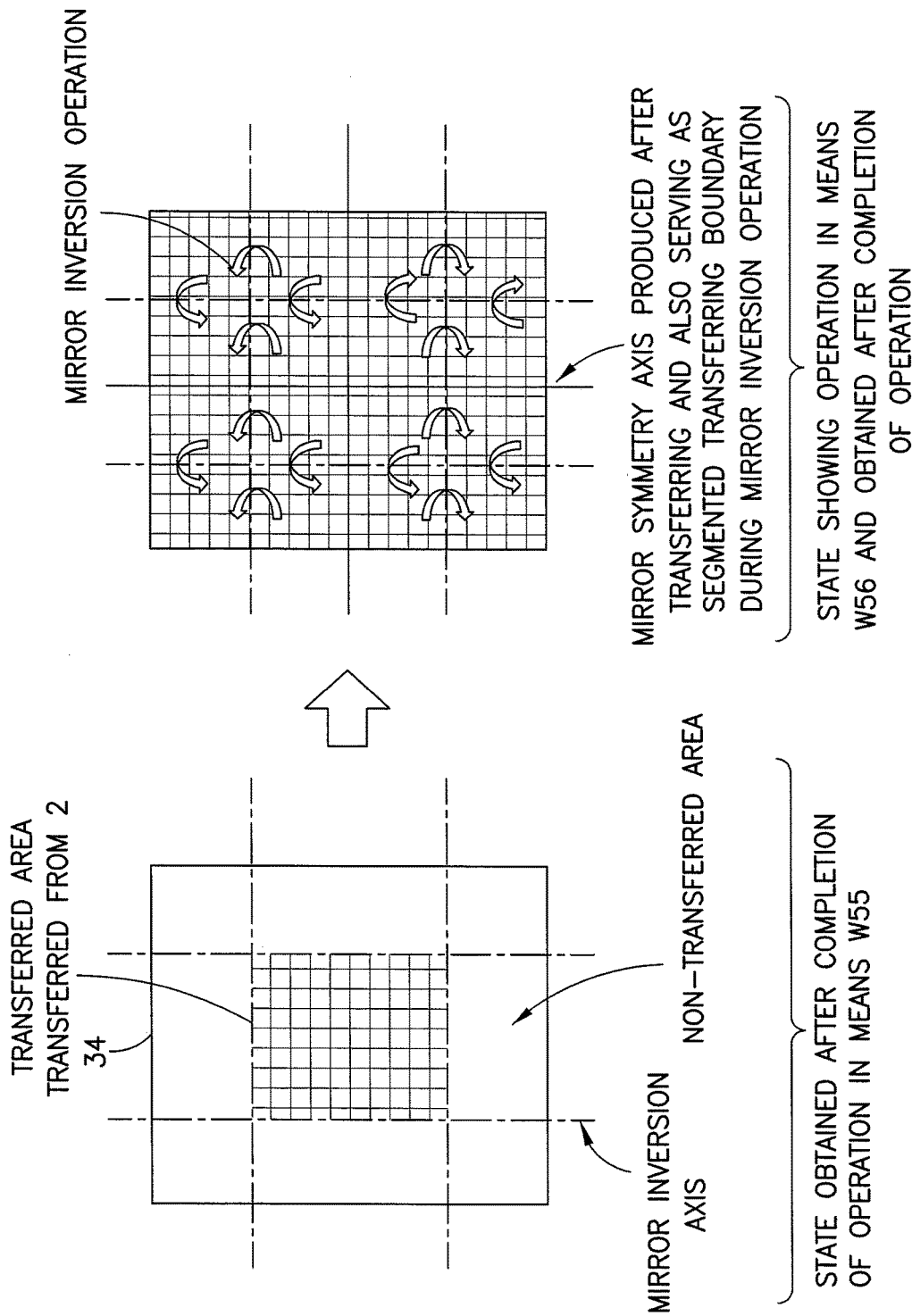
FIG. 15 is a diagram showing how the first correction means according to the seventeenth invention of the present invention performs correction.

FIG. 15 shows how the means W56 in the first correction means W10 of FIG. 14 performs correction. The left view in FIG. 15 shows a state at the end of the operation in the means W55, and the right view therein shows the operation in the means W56 and a state at the end of the operation. As shown in the left view in FIG. 15, the third corrected encryption key image 29 obtained at the end of the operation in the means W55 has the transferred area and the non-transferred area. In order to fill the non-transferred area by using pixel data in the transferred area, as shown in the right view in FIG. 15, in the means W56, a mirror inversion operation is performed by using the boundaries between the transferred area and the non-transferred area as mirror inversion axes, and the non-transferred area is filled by using pixel data in the transferred area. The right view in FIG. 15 also shows the state at the end of the operation in the means W56 and shows that axes of mirror symmetry are produced at segmented transfer boundaries used for the mirror inversion operation.

Figure 16:
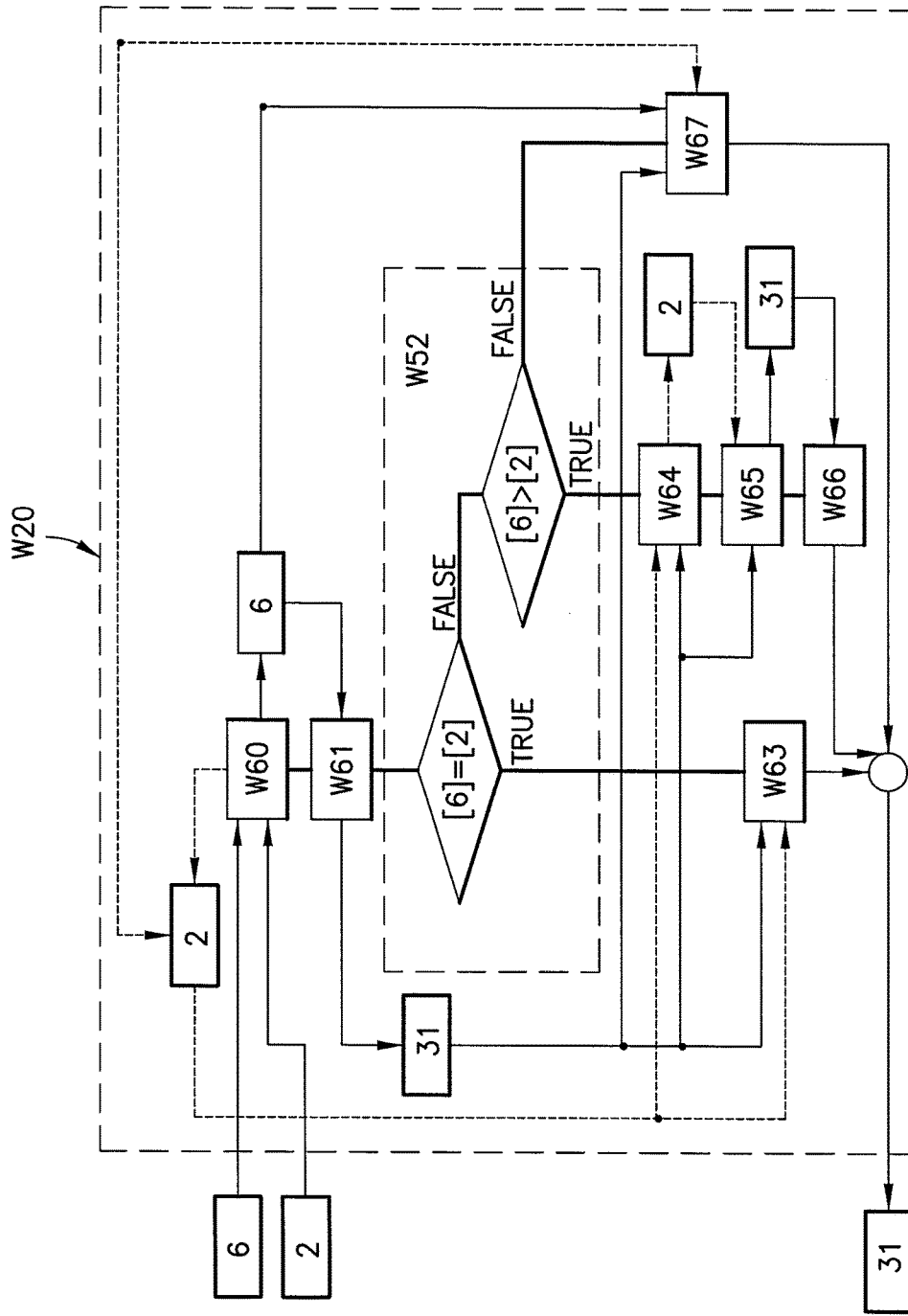
FIG. 16 is a diagram showing an example configuration of a second correction means according to an eighteenth invention of the present invention.

FIG. 16 is a diagram showing an example configuration of the second correction means W20 according to an eighteenth invention of the present invention. The second correction means W20 shown in FIG. 16 is characterized by including: (W60) a means for matching the pixel size of the encryption key image 2 to the pixel size of the received encrypted image 6; (W61) a means for preparing the fourth corrected encryption key image 31 having the same pixel size as the received encrypted image 6 and no data; (W62) a means for comparing the image size of the encryption key image 2 with the image size of the received encrypted image 6, advancing to means (W63) if they are equal to each other, advancing to means (W64) if the image size of the encryption key image 2 is smaller than the image size of the received encrypted image 6, and advancing to means (W67) otherwise; (W63) a means for transferring the encryption key image 2 to the fourth corrected encryption key image 31 and then ending the second correction; (W64) a means for moving the encryption key image 2 such that the coordinates of the center pixel of the encryption key image 2 are matched to the coordinates of the center pixel of the fourth corrected encryption key image 31; (W65) a means for transferring the encryption key image 2 to the fourth corrected encryption key image 31; (W66) a means for transferring pixels in the transferred area of the fourth corrected encryption key image 31 to the non-transferred area thereof by using the boundaries between the transferred area and the non-transferred area as mirror inversion axes, and then ending the second correction; (W67) a means for reducing the encryption key image 2 so as to be matched to the image size of the received encrypted image 6, transferring the reduced encryption key image 2 to the fourth corrected encryption key image 31, and then ending the second correction.

The correction performed by the means W66 in the second correction means W20 of FIG. 16 is the same as the correction performed by the means W56 in the first correction means W10 and conforms to the method shown in FIG. 15.

A third program 36, which is an example of the present invention, configures and implements all means in a first aspect of the cryptographic-communication image compressing/expanding device 28 of the twelfth invention, which includes the encryption means W3 of the thirteenth invention, the digital-image restoring means W9 of the fourteenth invention, the image-restoration calculation means W48 of the fifteenth invention, the first correction means W20 of the seventeenth invention, and the second correction means W20 of the eighteenth invention.

A fourth program 37, which is an example of the present invention, configures and implements all means in a second aspect of the cryptographic-communication image compressing/expanding device 28 of the twelfth invention, which includes the encryption means W3 of the thirteenth invention, the digital-image restoring means W9 of the fourteenth invention, the second aspect W49 of the image-restoration calculation means of the sixteenth invention, the first correction means W10 of the seventeenth invention, and the second correction means W20 of the eighteenth invention.

The third program and the fourth program are written in the Visual C++ language; however, the programs may be partially written in XML or JAVA (registered trademark), or the programs may be written in a combination of C, C+, HTTP, XML, and JAVA (registered trademark).

A third storage medium according to a twenty-first invention of the present invention stores the third program of a nineteenth invention in an encrypted state, can be connected to a computer, can be read by the computer, and uses a storage medium of the same type as the first storage medium.

A fourth storage medium according to a twenty-second invention of the present invention stores the fourth program of a twentieth invention in an encrypted state, can be connected to a computer, can be read by the computer, and uses a storage medium of the same type as the first storage medium. For the third to fourth storage media, storage media can be selected from a USB flash memory, an SD memory card, a CD, a DVD, etc.

Figure 17:
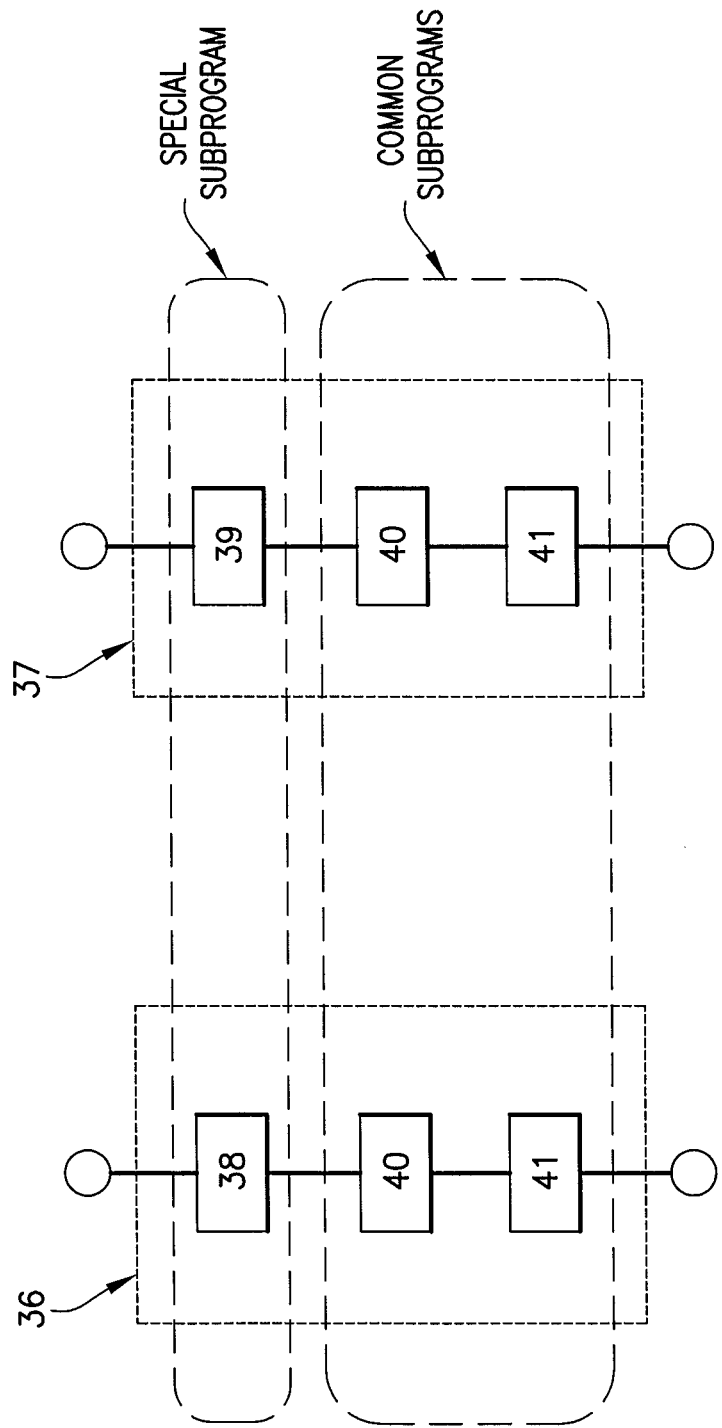
FIG. 17 is a diagram showing example configurations of a third program and a fourth program according to the present invention.

FIG. 17 is a diagram showing example configurations of the third program 36 and the fourth program 37. Each of the third program 36 and the fourth program 37 is composed of one special subprogram and two common subprograms. The special subprogram is a device subprogram that configures all the means according to the corresponding aspect of the cryptographic-communication image compressing/expanding device 28 and that describes execution procedures thereof. A device subprogram 38 is provided for the third program 36, and a device subprogram 39 is provided for the fourth program 37. The common subprograms are: an operation-window generating subprogram 40 that generates an operation window 54 used to perform operations related to the cryptographic-communication image compressing/expanding device 28, that displays the operation window 54 on a monitor of a computer, and that is common for all programs; and an operation-window monitoring subprogram 41 that constantly monitors all buttons on the operation window 54, buttons on a keyboard of the computer, a position specified by a mouse, and a right click and a left click at that position, that executes suitable processing, when there is an action directed to a monitoring target through a right click, a left click, etc., and that is common for all programs.

EXAMPLES

Example 1 pertains to an encrypted-image communication system 45 in which the cryptographic-communication image compressing/expanding device 28 of the present invention is configured, by the third program 36, on a computer 42 and a computer 44 that is on the Internet 43, thus allowing encrypted-image communications. On the other hand, the second aspect of the cryptographic-communication image compressing/expanding device 28, which is configured by the fourth program 37 and which includes partially different component means, has no difference in performance and operation from the first aspect of the cryptographic-communication image compressing/expanding device 28, which is configured by the third program 36. Thus, as the representative example of the cryptographic-communication image compressing/expanding device 28, the first aspect of the cryptographic-communication image compressing/expanding device 28, which is configured by the third program 36, is selected in Example 1.

Figure 18:
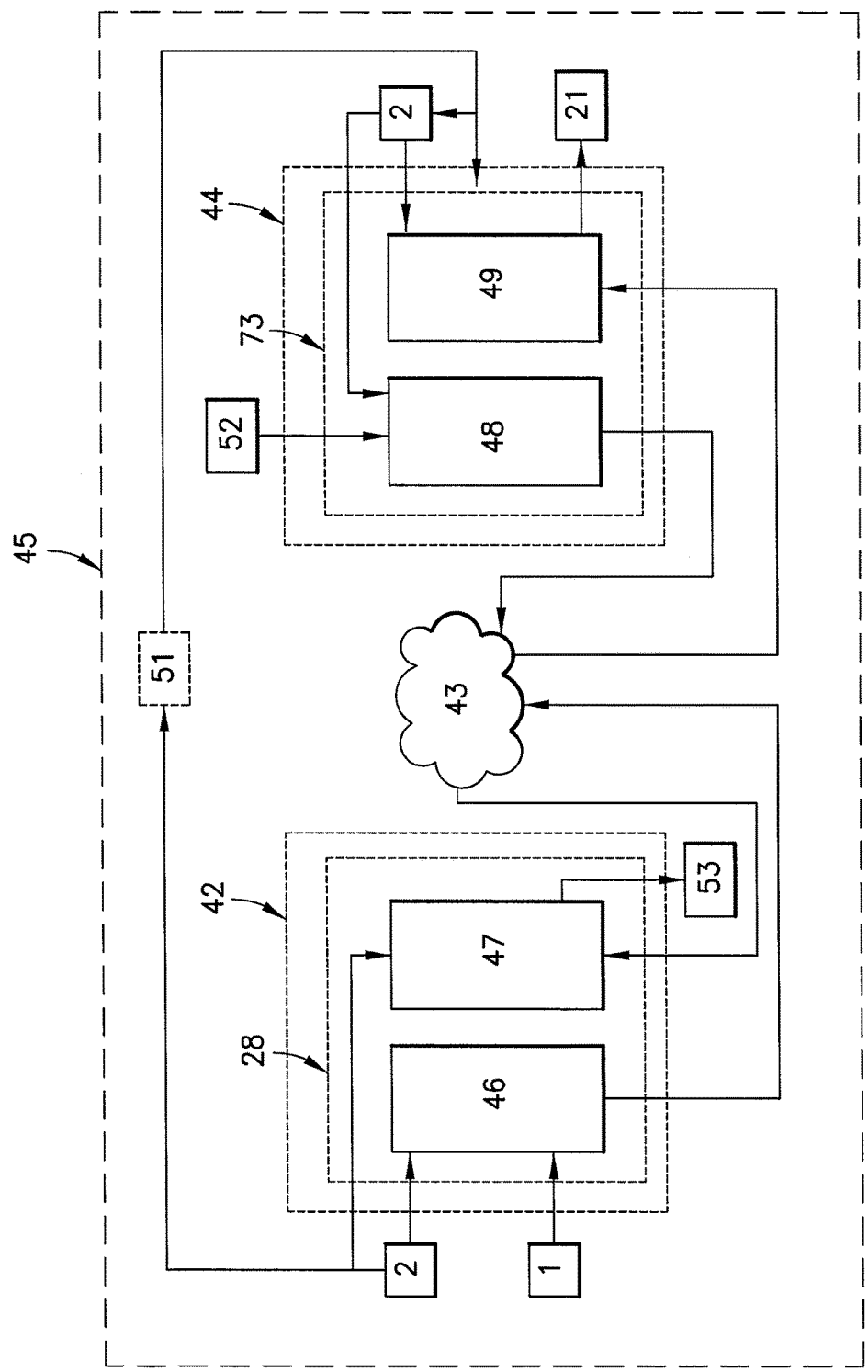
FIG. 18 is a diagram showing an example configuration of an encrypted-image communication system according to Example 1 of the present invention.

FIG. 18 is a diagram showing an example configuration of the encrypted-image communication system 45 according to Example 1 of the present invention. The encrypted-image communication system 45 shown in FIG. 18 is provided with: the digital image 1; the encryption key image 2; the maximum-likelihood digital image 21; the computer 42, in which the third program 36 is installed and executed in advance, thereby configuring a transmitting device 46 (corresponding to the transmitting side of FIG. 9) and a receiving device 47 (corresponding to the receiving side of FIG. 9) of the first aspect of the cryptographic-communication image compressing/expanding device 28; the computer 44 on the Internet 43, in which the third program 36 is installed and executed in advance, thereby configuring a transmitting device 48 (corresponding to the transmitting side of FIG. 9) and a receiving device 49 (corresponding to the receiving side of FIG. 9) of a cryptographic-communication image compressing/expanding device 73 that has the same configuration as the first aspect of the cryptographic-communication image compressing/expanding device 28; a Zip file 51 that is obtained by subjecting the encryption key image 2 to encryption and lossless compression by using an encryption function of the Zip file 51, in which a password 50 is used as a verification key, and that is delivered by being attached to e-mail; a digital image 52 that is used to be transmitted from the computer 44; and a maximum-likelihood digital image 53 that corresponds to the digital image 52.

The computers 42 and 44 have the same configurations and are each provided with: a 64-bit-instruction-set 6-core-chip CPU (Central Processing Unit); a GPU (Graphic Processing Unit); a memory of at least 32 gigabytes; an HDD having at least 1 terabyte of storage capacity; an SDD (Solidstate Disk Drive) having at least 128 gigabyte of storage capacity; at least three USB terminals; at least one LAN terminal; a wireless communication module, such as WiFi (Wireless Fidelity) or Bluetooth (registered trademark); a telephone terminal; a keyboard 53; a mouse 54; an FHD (Full High Definition) display; Microsoft Windows (registered trademark) 8 O/S; Microsoft Visual Studio 2010 (registered trademark) (including Visual C++ 2010); and Microsoft Office 2013 (registered trademark). The computers 42 and 44 are each capable of communicating with another computer via WiFi, Bluetooth (registered trademark), a LAN, USB, and the Internet. As the computers 42 and 44, computers selected from many kinds of desktop computers that are mass produced and distributed in the market are used, and they may be workstations as long as they conform to a similar standard. Furthermore, although the type of O/S is different, they may be servers.

Figure 19:
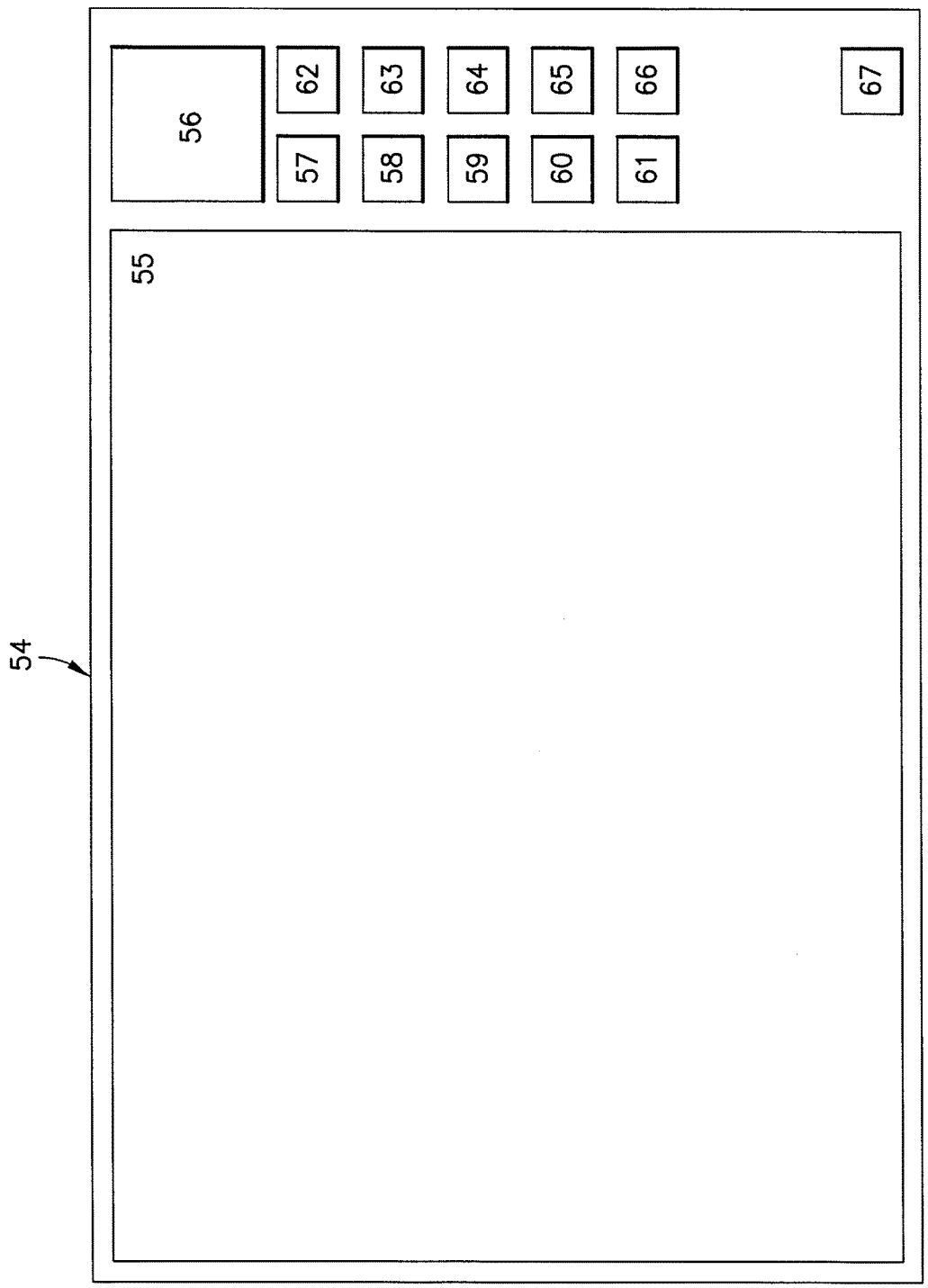
FIG. 19 is a diagram showing an example operation window according to the present invention.

FIG. 19 is a diagram showing an example of the operation window 54 of the present invention. The operation window 54 shown in FIG. 19 is provided with: an image window 55 that displays the digital image 1, the encryption key image 2, the maximum-likelihood digital image 21, etc., in tiles, or in an overlapped manner, or as thumbnails; an encryption-key-image thumbnail display window 56 that displays the currently-used encryption key image 2 in the form of a thumbnail, with its file name being overlapped with lower portion of the thumbnail; a scanning button 57 that is used to scan the digital image 1 directly from a scanner under predetermined conditions (conditions set in the scanner properties, which are opened by right-clicking on this button); a digital-image read button 58 that is used to read the digital image 1 from the file system of the computer 42 or the computer 44; an encryption-key-image read button 59 that is used to read the encryption key image 2 from the file system of the computer 42 or the computer 44; a maximum-likelihood-digital-image save button 60 that is used to save the maximum-likelihood digital image 21 to the file system of the computer 42 or the computer 44; a maximum-number-of-iterative-operations set button 61 that is used to set the maximum number of iterative operations 23; a transmission button 62 that is used to encrypt the read digital image 1 by using the read encryption key image 2, to further subject the digital image 1 to lossless compression, and to transmit the digital image 1; a suspend button 63 that is used to suspend the operation being executed; a received-encrypted-image display button 64 that is used to read, after completion of reception, the received encrypted image 6 from a received-encrypted-image box in the file system of the computer 42 or the computer 44; a decryption button 65 that is used to decrypt the read received encrypted image by using the encryption key image used when the received encrypted image is encrypted; a receiving display 66 that is used to display that reception from another computer via the Internet 43 is being performed in this system; and an end button 67 that is used to end this system. The operation window 54 is displayed on the monitor of the computer 42 and the monitor of the computer 44, and all of the buttons on the operation window 54 respond interactively to a click and touch thereon.

A description will be given of an example usage of the encrypted-image communication system 45 with reference to FIG. 18. First, a user 68 who operates the computer 42 calls a user 69 who operates the computer 44, requests to start up the cryptographic-communication image compressing/expanding device 73, and further tells the user 69 that the password 50 for the Zip file 51 has been transmitted, separately from the Zip file 51, in confidential e-mail through SSL encryption. Next, the user 68 starts up the first aspect of the cryptographic-communication image compressing/expanding device 28, in the computer 42. Then, the encrypted-image communication system 45 is set up.

The user 68 clicks on the digital-image read button 58 on the operation window 54 to read the digital image 1 from the file system of the computer 42. Then, the digital image 1 is displayed on the image window 55. Next, the user 68 clicks on the encryption-key-image read button 59 to read the encryption key image 2 from the file system of the computer 42. Then, the thumbnail of the encryption key image 2 and the file name thereof are displayed on the encryption-key-image thumbnail display window 56. Next, the user 68 clicks on the transmission button 62 to transmit the digital image 1 that has been subjected to encryption and lossless compression to the cryptographic-communication image compressing/expanding device 73 in the computer 44.

While checking, on the monitor of the computer 44, an operation window 70 that has the same configuration as the operation window 54, the user 69 checks received e-mail messages and obtains the Zip file 51 and the password 50, decompresses the Zip file 51 by using the password 50 to extract the encryption key image 2, and stores the encryption key image 2 in the file system of the computer 44. During this operation, the user 69 notices that a display on the operation window 70 that corresponds to the receiving display 66 is turned on, and waits for the display corresponding to the receiving display 66 to flash and then be turned off, i.e., for the reception to be completed.

The user 69 clicks on a button corresponding to the received-encrypted-image display button 64 to read the received encrypted image 6 from a received-encrypted-image box in the file system of the computer 44. Then, the received encrypted image 6 is displayed on an image window corresponding to the image window 55, on the operation window 70, which corresponds to and has the same specifications as the operation window 54. Next, the user 69 clicks on a button corresponding to the encryption-key-image read button 59 to read the encryption key image 2 from the file system of the computer 44. Then, the thumbnail of the encryption key image 2 and the file name thereof are displayed on a window corresponding to the encryption-key-image thumbnail display window 56. Next, the user 69 clicks on a button corresponding to the maximum-number-of-iterative-operations set button 61 to set the maximum number of iterative operations 23 and then clicks on a button corresponding to the decryption button 65 to start decryption.

Then, the received encrypted image 6 displayed on the image window corresponding to the image window 55, on the operation window 70 is gradually restored, and the maximum-likelihood digital image 21 appears soon, thus completing the decryption. In this state, the user 69 checks the result. If the user 69 considers that there is much noise, and thus additional restoration is needed, the user 69 clicks on a button corresponding to the maximum-number-of-iterative-operations set button 61 to set the maximum number of iterative operations 23, and then clicks on the button corresponding to the decryption button 65 to start decryption. If the user 69 considers that the result is ok, the user 69 clicks on a button corresponding to the maximum-likelihood-digital-image save button 60, gives a name to the maximum-likelihood digital image 21, and saves it to the file system of the computer 44.

In order to subject the digital image 52 to encryption with the encryption key image 2 and further lossless compression and to transmit it to the first aspect of the cryptographic-communication image compressing/expanding device 28 in the computer 42, the user 69 first clicks on a button corresponding to the digital-image read button 58 to read the digital image 52 from the file system of the computer 44. Then, the digital image 52 is displayed on the image window corresponding to the image window 55. Next, the user 69 clicks on the button corresponding to the transmission button 62 to transmit the digital image 52 that has been subjected to encryption and lossless compression, to the first aspect of the cryptographic-communication image compressing/expanding device 28 in the computer 42.

During this operation, the user 68 notices that the receiving display 66 on the operation window 70 is turned on and waits for the receiving display 66 to flash and then be turned off, i.e., for the reception to be completed. After completion, the user 68 clicks on the received-encrypted-image display button 64 to read a received encrypted image 71 from the received-encrypted-image box in the file system of the computer 42. Then, the received encrypted image 71 is displayed on the image window 55 on the operation window 54. Next, the user 69 clicks on the maximum-number-of-iterative-operations set button 61 to set the maximum number of iterative operations 23 and then clicks on the button corresponding to the decryption button 65 to start decryption.

Then, the received encrypted image 71 displayed on the image window 55 on the operation window 54 is gradually restored, and the maximum-likelihood digital image 53 appears soon, thus completing the decryption. In this state, the user 68 checks the result. If the user 68 considers that there is much noise, and thus additional restoration is needed, the user 68 clicks on the maximum-number-of-iterative-operations set button 61 to set the maximum number of iterative operations 23 and then clicks on the decryption button 65 to start decryption. If the user 68 considers that the result is ok, the user 68 clicks on the maximum-likelihood-digital-image save button 60, gives a name to the maximum-likelihood digital image 53, and saves it to the file system of the computer 42.

Example 2 pertains to an improved encrypted-image communication system 72 in which some of the components of the encrypted-image communication system 45 are configured by hardware, and in which some of the calculations are performed by servers, thus achieving a speed up.

Figure 20:
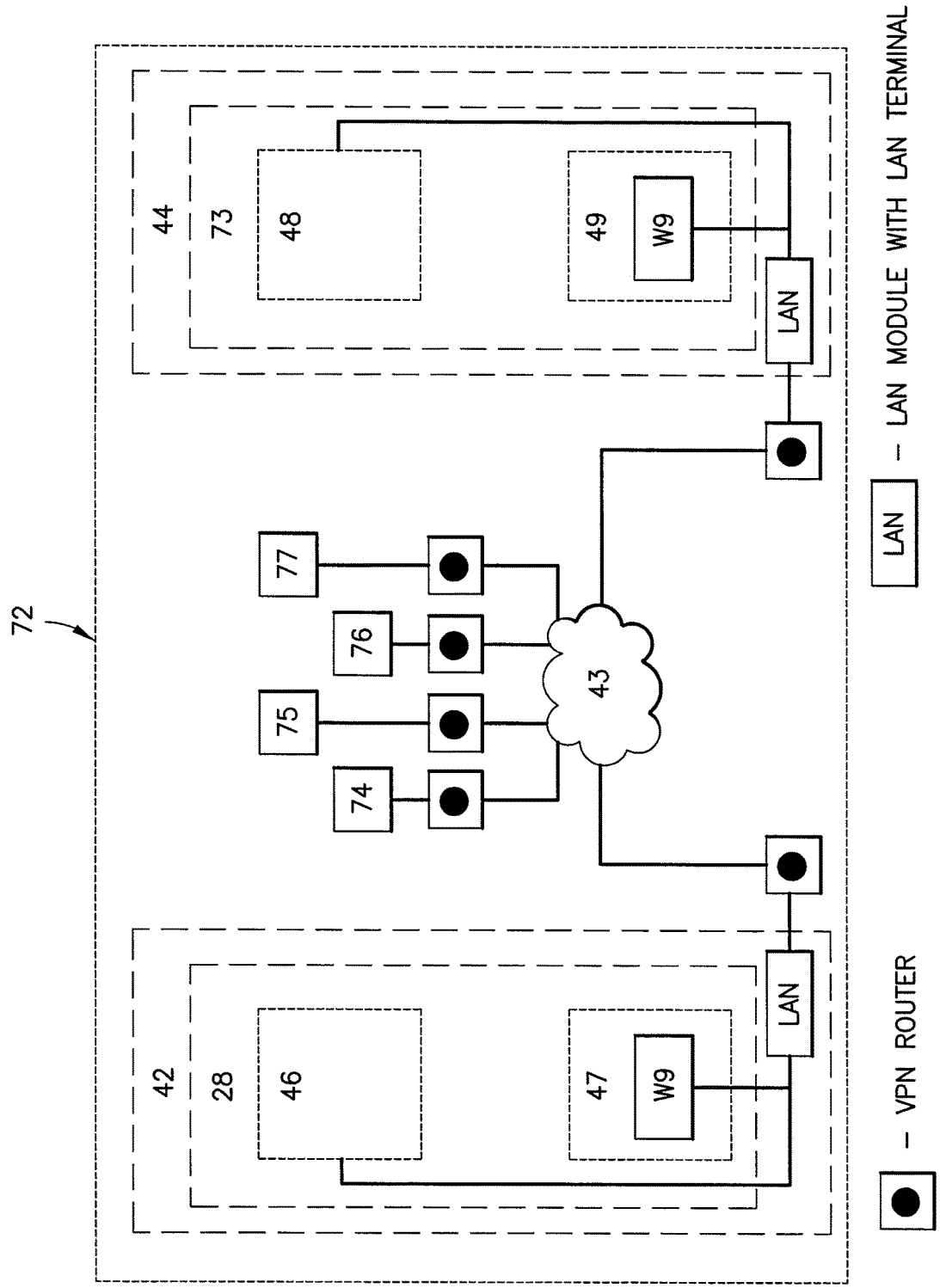
FIG. 20 is a diagram showing an example configuration of an improved encrypted-image communication system according to the present invention.

FIG. 20 is a diagram showing an example configuration of the improved encrypted-image communication system 72. In FIG. 20, the computer 42 and the computer 44 are each connected to servers 74 to 77 on the Internet 43 via a LAN module with a LAN terminal and a VPN router, and the servers 74 to 77 are connected to the Internet 43 via VPN routers. The computer 42, the computer 44, and the servers 74 to 77 are each provided with an FFT/IFFT (First Fourier Transfer/Inverse First Fourier Transfer) circuit board that is fabricated by using FPGAs and that is used to perform calculations for Fourier transformation and inverse Fourier transformation, and perform, by using the FFT/IFFT circuit board, calculations for Fourier transformation and inverse Fourier transformation in the image-restoration calculation means W48 used by the digital-image restoring means W9.

Furthermore, the servers 74 to 77 each have an image-restoration calculation means W48H manufactured by using FPGA. The image-restoration calculation means W48H is characterized in that calculations for Fourier transformation and inverse Fourier transformation are performed by using the FFT/IFFT circuit board. The FFT/IFFT circuit board is provided, in the form of a library, by FPGA makers, e.g., Xilinx, Inc. and Altera Corporation, or is available from companies that manufacture and sell motherboards or logic circuit boards. Furthermore, as the VPN routers, among commercially-available VPN routers, it is preferable to use encrypted-type high-speed VPN routers; however, as the computer 42, the computer 44, and the servers 74 to 77, it is necessary to use products of the same maker and the same model number.

The improved encrypted-image communication system 72 shown in FIG. 20 is configured such that calculations for Fourier transformation and inverse Fourier transformation in the encryption means W3 in the cryptographic-communication image compressing/expanding device 28 of the transmitting device 46 of the computer 42 and the transmitting device 48 of the computer 44 are performed by using the FFT/IFFT circuit boards of the respective computers, and is further configured such that the servers 74 to 77 serve as main calculating means for the digital-image restoring means W9 in the first aspect of the cryptographic-communication image compressing/expanding device 28 of the receiving device 47 of the computer 42 and the receiving device 49 of the computer 44.

The means W10 to W18 of the encryption means W3 are modified as follows. The encryption means W3 is modified so as to include: (W10) a first correction means for correcting the encryption key image 2 such that the image size of the encryption key image 2 is matched to that of the digital image 1, thus generating a third corrected encryption key image 29; (W11) a means for subjecting the third corrected encryption key image 29 to Fourier transformation by using the FFT/IFFT circuit board, thus generating a third-corrected-encryption-key-image spectrum 30; (W12) a means for subjecting the digital image 1 to de-gamma correction and then dividing the digital image 1 into a red-primary-color image RI, a green-primary-color image GI, and a blue-primary-color image BI; (W13) a means for subjecting RI, GI, and BI to Fourier transformation by using the FFT/IFFT circuit board, thus generating an RI spectrum RIS, a GI spectrum GIS, and a BI spectrum BIS; (W14) a means for multiplying the RI spectrum RIS by the third-corrected-encryption-key-image spectrum 30 and setting the thus-obtained product as an RIE spectrum RIES; (W15) a means for multiplying the GI spectrum GIS by the third-corrected-encryption-key-image spectrum 30 and setting the thus-obtained product as a GIE spectrum GIES; (W16) a means for multiplying the BI spectrum BIS by the third-corrected-encryption-key-image spectrum 30 and setting the thus-obtained product as a BIE spectrum BIES; (W17) a means for subjecting the RIE spectrum RIES, the GIE spectrum GIES, and the BIE spectrum BIES to inverse Fourier transformation by using the FFT/IFFT circuit board, thus generating an encrypted red-primary-color image RE in which a high-frequency region is removed, an encrypted green-primary-color image GE in which a high-frequency region is removed, and an encrypted blue-primary-color image BE in which a high-frequency region is removed; and (W18) a means for combining RE, GE, and BE into a single color image 10 and subjecting the color image 10 to gamma correction, thus generating the encrypted image 3.

The means W20 to W25 of the digital-image restoring means W9 are modified as follows. The digital-image restoring means W9 is modified so as to include: (W20) a means for transmitting the encryption key image 2 and the received encrypted image 6 to the server 74; (W21) a means for setting the maximum number of iterative operations 23; (W22) a means for transmitting the maximum number of iterative operations 23 to the servers 75 to 77; (W23) a means for receiving the red-primary-color digital image 18 from the server 75; (W24) a means for receiving the green-primary-color digital image 19 from the server 76; (W25) a means for receiving the blue-primary-color digital image 20 from the server 77; and (W26) a means for combining the red-primary-color digital image 18, the green-primary-color digital image 19, and the blue-primary-color digital image 20 into the maximum-likelihood digital image 21.

The server 74 is provided with: the second correction means W20; a dividing means for dividing a color image into the blue primary color, the green primary color, and the blue primary color; a Fourier-transform means using the FFT/IFFT circuit board; and an inverse-Fourier-transform means using the FFT/IFFT circuit board. The server 74 performs the service of: receiving the encryption key image 2 and the received encrypted image 6 from the digital-image restoring means W9 of the receiving device 47 in the computer 42 or the digital-image restoring means W9 of the receiving device 49 in the computer 44; obtaining the fourth corrected encryption key image 31 by using the second correction means W20; transmitting the fourth corrected encryption key image 31 as the H image 15 to the servers 75 to 77; dividing the received encrypted image 6 into the red-primary-color image 12, the green-primary-color image 13, and the blue-primary-color image 14 of the received encrypted image 6, by using the dividing means; transmitting the red-primary-color image 12 as the Y image 16 to the server 75; transmitting the green-primary-color image 13 as the Y image 16 to the server 76; and transmitting the blue-primary-color image 15 as the Y image 16 to the server 77.

The server 75 is provided with: a Fourier-transform means using the FFT/IFFT circuit board; an inverse-Fourier-transform means using the FFT/IFFT circuit board; and the image-restoration calculation means W48H. The server 75 performs the service of: receiving the maximum number of iterative operations 23 from the digital-image restoring means W9 of the receiving device 47 in the computer 42 or of the receiving device 49 in the computer 44; receiving the H image 15 and the Y image 16 from the server 74; obtaining the F image 17 from the H image 15 and the Y image 16 through execution of iterative operations up to the maximum number of iterative operations 23, by using the image-restoration calculation means W48H; and transmitting the F image 17 to the means W23 in the digital-image restoring means W9 of the receiving device 47 in the computer 42 or the means W23 in the digital-image restoring means W9 of the receiving device 49 in the computer 44.

The server 76 is provided with: a Fourier-transform means using the FFT/IFFT circuit board; an inverse-Fourier-transform means using the FFT/IFFT circuit board; and the image-restoration calculation means W48H. The server 76 performs the service of: receiving the maximum number of iterative operations 23 from the digital-image restoring means W9 of the receiving device 47 in the computer 42 or of the receiving device 49 in the computer 44; receiving the H image 15 and the Y image 16 from the server 74; obtaining the F image 17 from the H image 15 and the Y image 16 through execution of iterative operations up to the maximum number of iterative operations 23, by using the image-restoration calculation means W48H; and transmitting the F image 17 to the means W24 in the digital-image restoring means W9 of the receiving device 47 in the computer 42 or the means W24 in the digital-image restoring means W9 of the receiving device 49 in the computer 44.

The server 77 is provided with: a Fourier-transform means using the FFT/IFFT circuit board; an inverse-Fourier-transform means using the FFT/IFFT circuit board; and the image-restoration calculation means W48H. The server 77 performs the service of: receiving the maximum number of iterative operations 23 from the digital-image restoring means W9 of the receiving device 47 in the computer 42 or of the receiving device 49 in the computer 44; receiving the H image 15 and the Y image 16 from the server 74; obtaining the image 17 from the H image 15 and the Y image 16 through execution of iterative operations up to the maximum number of iterative operations 23, by using the image-restoration calculation means W48H; and transmitting the F image 17 to the means W25 in the digital-image restoring means W9 of the receiving device 47 in the computer 42 or the means W25 in the digital-image restoring means W9 of the receiving device 49 in the computer 44.

The improved encrypted-image communication system 72 of Example 2 is significantly improved in processing speed compared with the encrypted-image communication system 45 of Example 1; however, there is no change in usage, and there is no difference in processing quality.

Figure 21:
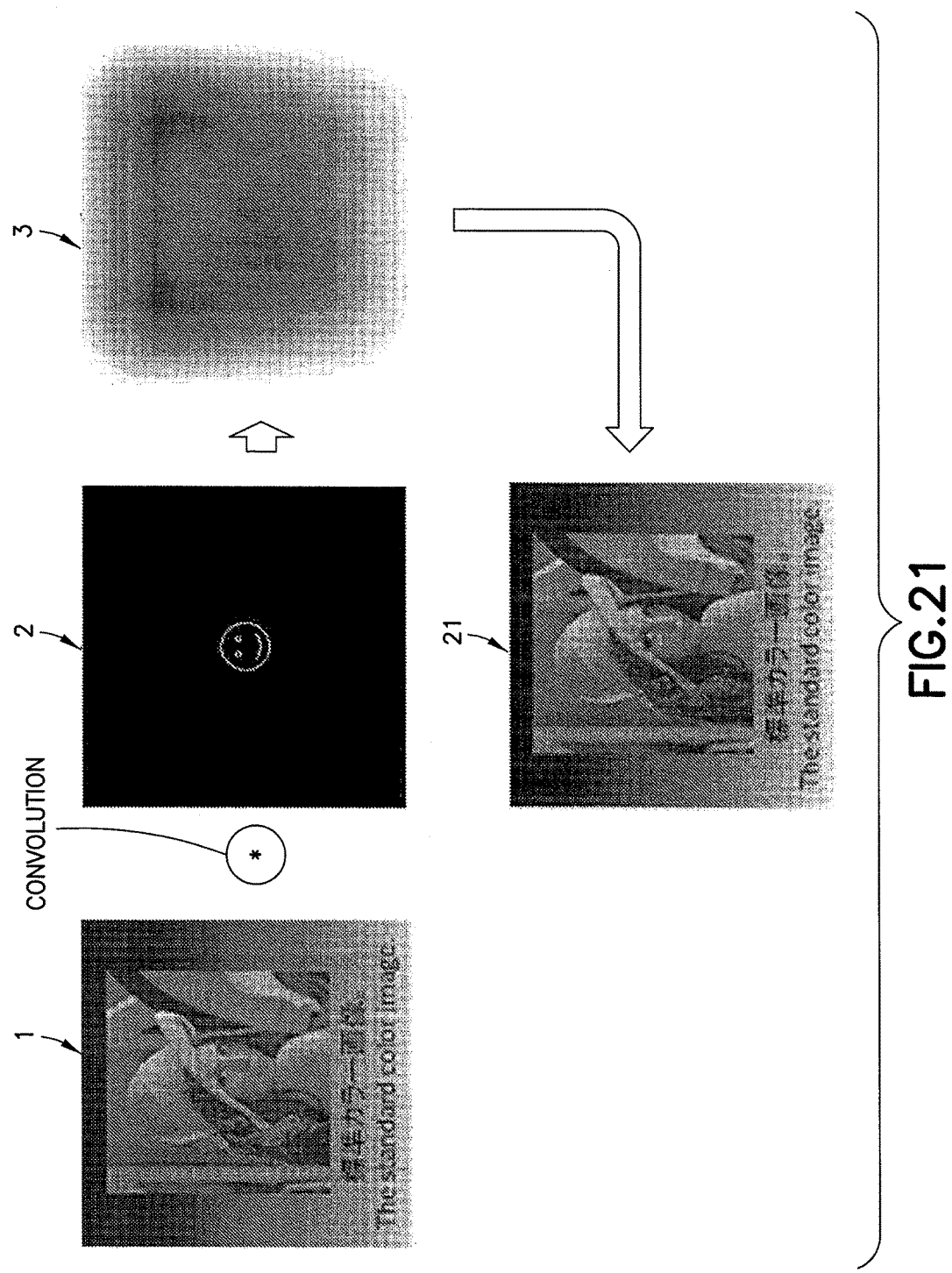
FIG. 21 is a view showing example cryptographic communication performed by the improved encrypted-image communication system according to Example 2 of the present invention.

FIG. 21 shows example cryptographic communication performed by the improved encrypted-image communication system of Example 2. FIG. 21 shows the digital image 1, the encryption key image 2, and the encrypted image 3, from the left at the upper stage, and the maximum-likelihood digital image 21 at the bottom stage. Although the maximum number of iterative operations 23 is 5,000, in a method of automatically determining convergence from the degree of change in the F image 17 before and after the k-th iterative operation, the iterative operation stops after about 100 to 400 iterations. In order to reduce surrounding noise, additional iterative operations are continuously performed up to the maximum number of iterative operations 23, thereby obtaining the maximum-likelihood digital image 21 as a result. The compression ratio of the encrypted image 3 through entropy coding is 69%, and a predictable result is obtained. In FIG. 21, the digital image 1 is sufficiently encrypted so as to be unrecognizable, high-frequency data in the frequency space is removed, and the digital image 1 is restored as the maximum-likelihood digital image 21 by the improved encrypted-image communication system 72. With the naked eye, the maximum-likelihood digital image 21 shows no difference from the digital image 1 and is almost the same as the digital image 1, and thus, it can be said that the digital image 1 has been visually subjected to lossless compression/expansion and lossless encryption/decryption. The quality of cryptographic communication performed by the encrypted-image communication system 45 of Example 1 is also the same as that shown in FIG. 21. In the example shown in FIG. 21, because the encryption key image 2 has a design for producing an intermediate encryption strength between middle and strong levels, the maximum number of iterative operations 23 is 5,000; however, if the encryption key image 2 has a weak design, for example, using a circular ring, the maximum-likelihood digital image 21, which is visually the same as the digital image 1, can be obtained in almost real time through about 200 to 300 iterative operations. It is even possible to lower the encryption strength depending on the design of the encryption key image 2, thus further improving the real-time characteristics.

Example 3 pertains to a cryptographic-communication monitoring camera system 78 to which is applied an improved high-speed encrypted-image communication system 85, which is obtained by increasing, for video, the speed of the improved encrypted-image communication system 72.

In the improved high-speed encrypted-image communication system 85, the FFT/IFFT circuit boards of the computer 42, the computer 44, and the servers 74 to 77 are changed to DCT/IDCT (Discrete Cosine Transform/Inverse Discrete Cosine Transform) circuit boards, and furthermore, the image-restoration calculation means W48H is modified to a second aspect W49H of the image-restoration calculation means that is obtained by configuring the second aspect W49 of the image-restoration calculation means by hardware by using FPGA. By doing so, the amount of calculation in the Fourier-transform means and the inverse-Fourier-transform means is reduced by half, and furthermore, the amount of calculation required for image restoration calculation is reduced by 15% of the number of iterative operations, thus achieving a significant speed-up. For example, when the number of iterative operations is 100, the amount of calculation required for image restoration calculation is reduced by 14%, and, as the number of iterative operations is increased, the reduction in the amount of calculation approaches 15%. Accordingly, the improved high-speed encrypted-image communication system 85 achieves a speed-up of nearly 65% compared with the improved encrypted-image communication system 72. However, because the encryption key image 2 needs to be point symmetric, a circular ring having 1-pixel width and a desired radius is used in Example 3. As the radius of the circular ring is increased, the encryption strength becomes stronger; therefore, a required radius is set in advance.

Figure 22:
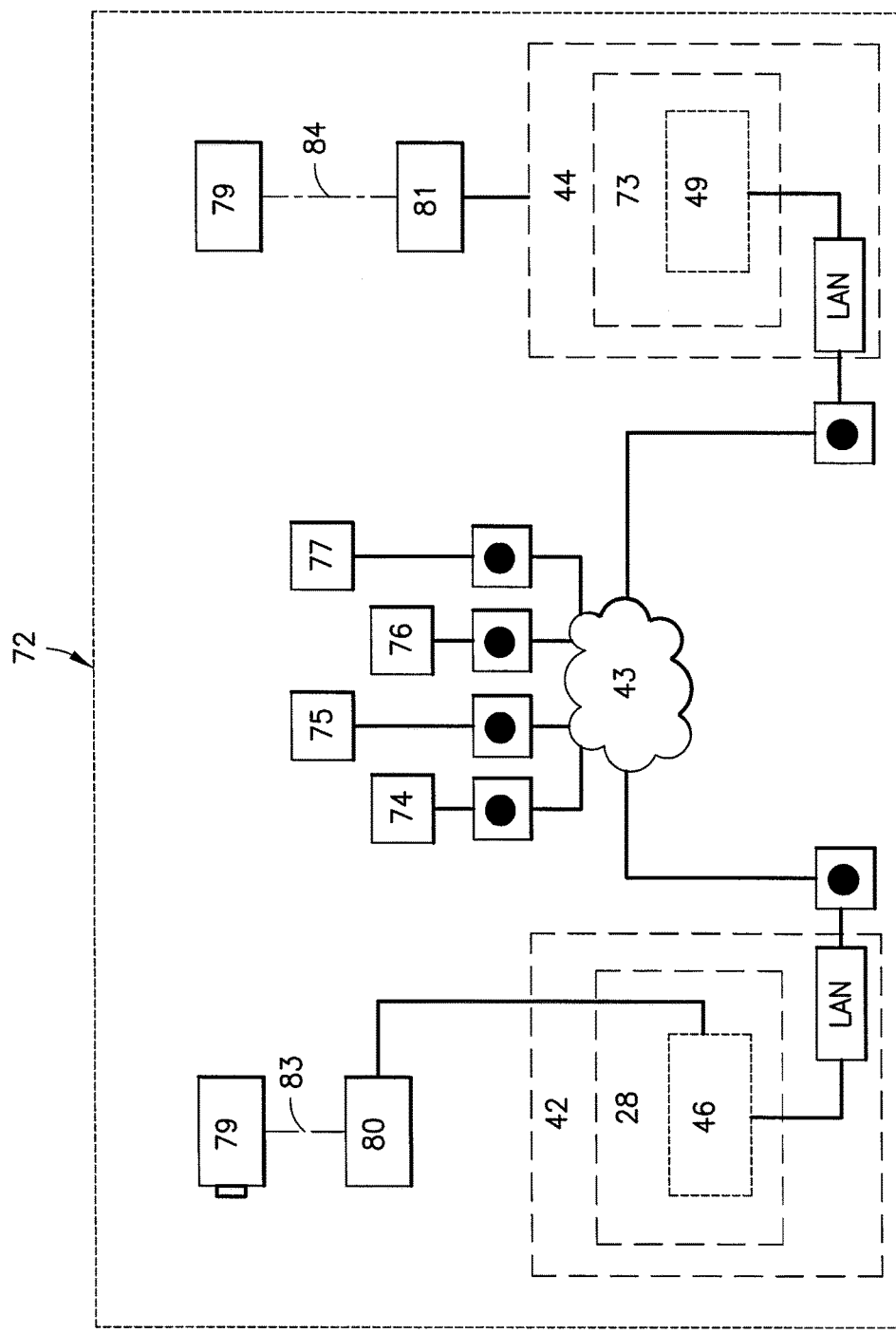
FIG. 22 is a diagram showing an example configuration of a cryptographic-communication monitoring camera system according to Example 3 of the present invention.

FIG. 22 is a diagram showing an example configuration of the cryptographic-communication monitoring camera system 78 of Example 3. The cryptographic-communication monitoring camera system 78 shown in FIG. 22 is provided with: the Internet 43; the transmitting device 46 of the cryptographic-communication image compressing/expanding device 28 in the improved encrypted-image communication system 72; the receiving device of the cryptographic-communication image compressing/expanding device 73 in the improved encrypted-image communication system 72; the servers 74 to 77; a monitoring camera 79 that outputs a video signal in the progressive digital BMP format; a capture board 80 that receives the video signal in the progressive digital BMP format, that breaks the video signal into frames, and that outputs the digital image 1 in the BMP format; a TV-video circuit board 81 that converts the maximum-likelihood digital image 21 into TV video and outputs a TV video signal; a TV monitor 82; an IEEE1394 cable 83; an HDMI (registered trademark) cable 84; a LAN module with a LAN terminal that is connected to a bus in the computer 42 or 44, thus allowing LAN communication; and VPN routers that generate an encrypted VPN between VPN routers with the same model number to form an encrypted dedicated line on the Internet 43. In FIG. 22, for example, the IEEE1394 cable 83 is used to connect the monitoring camera 79 to the capture board 80, and the HDMI (registered trademark) cable 84 is used to connect between the computer 44 and the TV-video circuit board 81 and between the TV-video circuit board 81 and the TV monitor 82; however, other cables can be used.

An example procedure in the cryptographic-communication monitoring camera system 78 is as follows: (Step 1) the user 68 specifies the encryption key image 2, separately encrypts the encryption key image 2 by using password-verification encryption of a Zip file or the like, and transmits, to the computer 44, a thus-obtained Zip file 51 attached to an e-mail message; (Step 2) the user 68 confidentially transmits, to the computer 44, the password 50 to be used to decrypt the encryption of the Zip file 51, by SSL mail; (Step 3) the user 69, who is an operator of the computer 44, decrypts the Zip file 51 by using the password 50 and saves it in the file system of the computer 44; (Step 4) the monitoring camera 79 transmits a video signal in the progressive digital BMP format to the capture board 80; (Step 5) the capture board 80 transfers the single digital image 1 in the BMP format to the transmitting device 46; (Step 6) the transmitting device 46 generates the encrypted image 3 from the digital image 1 and the encryption key image 2, subjects the encrypted image 3 to entropy coding to generate the encrypted-image code 4, and transmits the encrypted-image code 4 to the computer 44 on the Internet 43 via the LAN modules and the VPN routers; (Step 7) the receiving device 49 of the computer 44 receives the encrypted-image code 4, subjects the encrypted-image code 4 to lossless expansion by the inverse method of the method used for entropy coding, thus generating the received encrypted image 6, decrypts the received encrypted image 6 by using the encryption key image 2 in the file system of the computer 44, thus generating the maximum-likelihood digital image 21, and transmits the maximum-likelihood digital image 21 to the TV-video circuit board 81; (Step 8) the TV-video circuit board 81 converts the maximum-likelihood digital image 21 into TV video and transmits the TV video signal to the TV monitor 82; and (Step 9) the TV monitor 82 displays the maximum-likelihood digital image 21 converted into the TV video.

The cryptographic-communication monitoring camera system of Example 3 is based on the improved encrypted-image communication system 72, which uses a lot of hardware; however, in order to deal with a large image of 1,360 horizontal pixels×1,024 vertical pixels, it is desirable that the encryption key image 2 have a design capable of defocusing letters, the face of a person, etc. in video so as to be unrecognizable and capable of restoring it through about 20 iterative operations. As an example of the encryption key image 2 of such a weak level, it is possible to use an image in which a white (R, G, B)=(255, 255, 255) circular ring with a 10-pixel radius and a 1-pixel width is used at the center of a black (0 bits) background having 1,360 horizontal pixels× 1,024 vertical pixels. Although a high-frequency region can be easily removed by using a lowpass filter in a spatial frequency region, which is a well-known technique, a low-frequency portion in the image remains, the image is sufficiently recognized, and thus this method is not suitable for the present invention.

The quality of the maximum-likelihood digital image 21 in the cryptographic-communication monitoring camera system 78 of Example 3 has no practical problem and has no noticeable difference from that of FIG. 21.

INDUSTRIAL APPLICABILITY

In the present invention, an image or a video is subjected to discrete convolution with an encryption key image, to be defocused beyond recognition, thus being encrypted and compressed, the encrypted image or video is transmitted over the Internet, and iterative operations are performed by using the separately-delivered encryption key image on the basis of Bayse probabilistic formula, to restore the image or video before encryption. The present invention is applicable to services for transmitting images or videos over the Internet, for example: businesses for distributing content, such as images and videos; monitoring-camera-device manufacturing and selling businesses; precision equipment industry and electronics industries that develop and manufacture video cameras and digital cameras; industries that develop software, such as applications and games; businesses of medical equipment, such as endoscopes and MRIs; businesses of information equipment, such as monitors; businesses of disaster-prevention and security equipment, such as monitoring cameras; archiving businesses; etc.

REFERENCE SIGNS LIST

1 . . . digital image, 2 . . . encryption key image, 3 . . . encrypted image, 4 . . . encrypted-image code, 5 . . . computer, 6 . . . received encrypted image, 7 . . . network, 8 . . . first corrected encryption key image, 9 . . . first-corrected-encryption-key-image spectrum, 10 . . . color image, 10 . . . digital image spectrum, 11 . . . second corrected encryption key image, 12 . . . red-primary-color image, 13 . . . green-primary-color image, 14 . . . blue-primary-color image, 15 . . . H image, 16 . . . Y image, 17 . . . F image, 18 . . . red-primary-color digital image, 19 . . . green-primary-color digital image, 20 . . . blue-primary-color digital image, 21 . . . maximum-likelihood digital image, 22 . . . H-image spectrum, 23 . . . maximum number of iterative operations, 24 . . . F-image initial values, 25 . . . F-image initial-value spectrum, 26 . . . third-function spectrum, 27 . . . fourth-function spectrum, 28 . . . cryptographic-communication image compressing/expanding device, 29 . . . third corrected encryption key image, 30 . . . third-corrected-encryption-key-image spectrum, 31 . . . fourth corrected encryption key image, 32 . . . ninth-function spectrum, 33 . . . tenth-function spectrum, 34 . . . first program, 35 . . . second program, 36 . . . third program, 37 . . . fourth program, 38 . . . device subprogram, 39 . . . device subprogram, 40 . . . operation-window generating subprogram, 41 . . . operation-window monitoring subprogram, 42 . . . computer, 43 . . . Internet, 44 . . . computer, 44 . . . encrypted-image communication system, 46 . . . transmitting device, 47 . . . receiving device, 48 . . . transmitting device, 49 . . . receiving device, 50 . . . password, 51 . . . Zip file, 52 . . . digital image, 53 . . . maximum-likelihood digital image, 54 . . . operation window, 55 . . . image window, 56 . . . encryption-key-image thumbnail display window, 57 . . . scanning button, 58 . . . digital-image read button, 59 . . . encryption-key-image read button, 60 . . . maximum-likelihood-digital-image save button, 61 . . . maximum-number-of-iterative-operations set button, 62 . . . transmission button, 63 . . . suspend button, 64 . . . received-encrypted-image display button, 65 . . . decryption button, 66 . . . receiving display, 67 . . . end button, 68 . . . user, 69 . . . user, 70 . . . operation window, 71 . . . received encrypted image, 72 . . . improved encrypted-image communication system, 73 . . . cryptographic-communication image compressing/expanding device, 74 . . . server, 75 . . . server, 76 . . . server, 77 . . . server, 78 . . . cryptographic-communication monitoring camera system, 79 . . . monitoring camera, 80 . . . capture board, 81 . . . TV-video circuit board, 82 . . . TV monitor, 83 . . . IEEE1394 cable, 84 . . . HDMI (registered trademark) cable, BE . . . encrypted blue-primary-color image, BI . . . blue-primary-color image of digital image 1, BIES . . . BIE spectrum, BIS . . . BI spectrum, F1 . . . first function, F2 . . . second function, F3 . . . third function, F4 . . . fourth function, F5 . . . fifth function, F6 . . . sixth function, F7 . . . seventh function, F8 . . . eighth function, F9 . . . ninth function, F10 . . . tenth function, F11 . . . eleventh function, F12 . . . twelfth function, GE . . . encrypted green-primary-color image, GI . . . green-primary-color image of digital image 1, GIES . . . GIE spectrum, GIS . . . GI spectrum, LAN . . . LAN module with LAN terminal, n . . . value of counter, RE . . . encrypted red-primary-color image, RI . . . red-primary-color image of digital image 1, RIES . . . RIE spectrum, RIS . . . RI spectrum, S1 to S2 . . . step, S3 . . . encryption step, S4 to S8 . . . step, S9 . . . digital-image restoring step, S10 . . . first correction step, S11 to S18 . . . step, S20 . . . second correction step, S21 to S25 . . . step, S41C . . . step, S30 to S47 . . . step, S48 . . . image-restoration calculation step, S49 . . . second aspect of image-restoration calculation step, S50 to S57 . . . step, S60 to S67 . . . step, W1 to W2 . . . means, W3 . . . encryption means, W4 to W8 . . . means, W9 . . . digital-image restoring means, W10 . . . first correction means, W11 to W18 . . . means, W20 . . . second correction means, W21 to W25 . . . means, W30 to W47 . . . means, W41C . . . means, W48 . . . image-restoration calculation means, W49 . . . second aspect of image-restoration calculation means, W50 to W57 . . . means, W60 to W67 . . . means

The invention claimed is:

1. A cryptographic-communication image compressing/expanding method in which a digital image is compressed while being encrypted and is transmitted over a network, and the compressed digital image is expanded and decrypted at a receiving side, thereby restoring the digital image, the method being characterized by comprising:
(S1) an image retrieving step of retrieving a digital image;
(S2) a step of preparing a grayscale encryption key image with a desired encryption strength;
(S3) an encryption step of subjecting the digital image to convolution with the encryption key image, to remove high-frequency components in the digital image, to reduce the resolution thereof, and to encrypt the digital image, thus obtaining an encrypted image;
(S4) a step of subjecting the encrypted image to entropy coding, thus converting the encrypted image into encrypted-image code;
(S5) a step of transmitting the encrypted-image code to another computer on the network;
(S6) a step of receiving the encrypted-image code at said another computer;
(S7) a step of decoding, at said another computer, the encrypted-image code by using a decoding method corresponding to encoding used for the entropy coding, thus generating a received encrypted image;
(S8) a step of decrypting and preparing, at said another computer, the encryption key image, which is encrypted in advance, is separately delivered, and is used in the encryption step; and
(S9) a digital-image restoring step of restoring, at said another computer, from the encryption key image and the received encrypted image, a maximum-likelihood digital image that has the maximum likelihood of the received encrypted image, wherein the encryption key image is an image of which a color of a background is black and having a design at its center.

2. A cryptographic-communication image compressing/expanding method according to claim 1, characterized in that the encryption step described in claim 1 comprises:
(S10) a first correction step of correcting the encryption key image such that the image size of the encryption key image is matched to that of the digital image, thus generating a first corrected encryption key image;
(S11) a step of subjecting the first corrected encryption key image to Fourier transformation, thus generating a first-corrected-encryption-key-image spectrum;
(S12) a step of subjecting the digital image to de-gamma correction and then dividing the digital image into a red-primary-color image RI, a green-primary-color image GI, and a blue-primary-color image BI;
(S13) a step of subjecting the RI, the GI, and the BI to Fourier transformation, thus generating an RI spectrum, a GI spectrum, and a BI spectrum;
(S14) a step of multiplying the RI spectrum by the first-corrected-encryption-key-image spectrum and setting the thus-obtained product as an RIE spectrum;
(S15) a step of multiplying the GI spectrum by the first-corrected-encryption-key-image spectrum and setting the thus-obtained product as a GIE spectrum;
(S16) a step of multiplying the BI spectrum by the first-corrected-encryption-key-image spectrum and setting the thus-obtained product as a BIE spectrum;
(S17) a step of subjecting the RIE spectrum, the GIE spectrum, and the BIE spectrum to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and
(S18) a step of combining the RE, the GE, and the BE into a single color image and subjecting the color image to gamma correction, thus generating the encrypted image.

3. A cryptographic-communication image compressing/expanding method according to claim 2, characterized in that the first correction step described in claim 2 comprises:
(S50) a step of matching the pixel size of the encryption key image to the pixel size of the digital image;
(S51) a step of preparing the first corrected encryption key image having the same image size as the digital image and no data;
(S52) a step of comparing the image size of the encryption key image with the image size of the digital image, advancing to step (S53) if they are equal to each other, advancing to step (S54) if the image size of the encryption key image is smaller than the image size of the digital image, and advancing to step (S57) otherwise;
(S53) a step of transferring the encryption key image to the first corrected encryption key image and then ending the first correction step;
(S54) a step of moving the encryption key image such that the coordinates of the center pixel of the encryption key image are matched to the coordinates of the center pixel of the first corrected encryption key image;
(S55) a step of transferring the encryption key image to the first corrected encryption key image;
(S56) a step of transferring pixels in a transferred area of the first corrected encryption key image to a non-transferred area thereof by using boundaries between the transferred area and the non-transferred area as mirror inversion axes and then ending the first correction step; and
(S57) a step of reducing the encryption key image so as to be matched to the image size of the digital image, transferring the reduced encryption key image to the first corrected encryption key image, and then ending the first correction step.

4. A cryptographic-communication image compressing/expanding method according to claim 1, characterized in that the digital-image restoring described in claim 1 comprises:
- (S20) a second correction step of correcting the encryption key image such that the image size of the encryption key image is matched to that of the received encrypted image, thus generating a second corrected encryption key image;
- (S21) a step of dividing the received encrypted image into a red-primary-color image, a green-primary-color image, and a blue-primary-color image;
- (S22) a step of setting the second corrected encryption key image as an H image, setting the red-primary-color image as a Y image, restoring an F image by using an image-restoration calculation step in which the F image is restored from the H image and the Y image, and setting this F image as a red-primary-color digital image;
- (S23) a step of setting the green-primary-color image as a Y image, restoring an F image by using the image-restoration calculation step, and setting this F image to a green-primary-color digital image;
- (S24) a step of setting the blue-primary-color image as a Y image, restoring an F image by using the image-restoration calculation step, and setting this F image as a blue-primary-color digital image; and
- (S25) a step of combining the red-primary-color digital image, the green-primary-color digital image, and the blue-primary-color digital image into the maximum-likelihood digital image.

5. A cryptographic-communication image compressing/expanding method according to claim 4, characterized in that the image-restoration calculation step described in claim 4 comprises:
- (S30) a step of subjecting the H image to Fourier transformation, thus obtaining an H-image spectrum;
- (S31) a step of setting a maximum number of iterative operations;
- (S32) a step of setting a counter for counting the number of iterative operations to 0, thus resetting the counter;
- (S33) a step of subjecting the Y image to de-gamma correction, thus obtaining a Y image, and of further setting the Y image to F-image initial values;
- (S34) a step of subjecting the F-image initial values to Fourier transformation, thus obtaining an F-image initial-value spectrum;
- (S35) a step of multiplying the H-image spectrum by the F-image initial-value spectrum and setting the thus-obtained product as a first function;
- (S36) a step of inverting the first function, thus generating a second function;
- (S37) a step of multiplying the Y image by the second function and setting the thus-obtained product as a third function;
- (S38) a step of subjecting the third function to Fourier transformation, thus obtaining a third-function spectrum;
- (S39) a step of obtaining a reversal function of the H image and setting the obtained function to a fourth function;
- (S40) a step of subjecting the fourth function to Fourier transformation, thus obtaining a fourth-function spectrum;
- (S41) a step of multiplying the third-function spectrum by the fourth-function spectrum and setting the thus-obtained product as a fifth function;
- (S42) a step of subjecting the fifth function to inverse Fourier transformation, thus obtaining a sixth function;
- (S43) a step of multiplying the sixth function by the F-image initial values and setting the thus-obtained product as an F image;
- (S44) a step of setting the F image to the F-image initial values;
- (S45) a step of adding 1 to the counter;
- (S46) a step of verifying a hypothesis in which the value of the counter exceeds the maximum number of iterative operations, returning to step S34 if the verification result is false, and advancing to step S47 if the verification result is true; and
- (S47) a step of subjecting the F image to gamma correction, thus obtaining an F image, and of outputting the F image.

6. A cryptographic-communication image compressing/expanding method according to claim 5, characterized in that, in a second aspect of the image-restoration calculation step described in claim 5, a point-symmetric image is used as the encryption key image, thereby eliminating steps S39 and S40 and changing step S41 to (S41C) a step of multiplying the third-function spectrum by the H-image spectrum and setting the thus-obtained product as a fifth function.

7. A cryptographic-communication image compressing/expanding method according to claim 4, characterized in that the second correction step described in claim 4 comprises:
- (S60) a step of matching the pixel size of the encryption key image to the pixel size of the received encrypted image;
- (S61) a step of preparing the second corrected encryption key image having the same image size as the received encrypted image and no data;
- (S62) a step of comparing the image size of the encryption key image with the image size of the received encrypted image, advancing to step (S63) if they are equal to each other, advancing to step (S64) if the image size of the encryption key image is smaller than the image size of the received encrypted image, and advancing to step (S67) otherwise;
- (S63) a step of transferring the encryption key image to the second corrected encryption key image and then ending the second correction step;
- (S64) a step of moving the encryption key image such that the coordinates of the center pixel of the encryption key image are matched to the coordinates of the center pixel of the second corrected encryption key image;
- (S65) a step of transferring the encryption key image to the second corrected encryption key image;
- (S66) a step of transferring pixels in a transferred area of the second corrected encryption key image to a non-transferred area thereof by using the boundaries between the transferred area and the non-transferred area as mirror inversion axes and then ending the second correction step; and
- (S67) a step of reducing the encryption key image so as to be matched to the image size of the received encrypted image, transferring the reduced encryption key image to the second corrected encryption key image, and then ending the second correction step.

8. A cryptographic-communication image compressing/expanding method according to claim 1, wherein the design in the encryption key image is not point-symmetric.

9. A cryptographic-communication image compressing/expanding method according to claim 8, wherein the encryption key image is selected for making the encrypted image too unclear to understand that the encrypted image corresponds to the digital image.

10. A first program stored in a non-transitory medium to cause a computer system to execute a cryptographic-communication image compressing/expanding method according to claim 1.

11. A second stored in a non-transitory medium to cause a computer system to execute a cryptographic-communication image compressing/expanding method according to claim 6.

12. A cryptographic-communication image compressing/expanding system in which a digital image is compressed while being encrypted and is transmitted over a network, and the compressed digital image is expanded and decrypted to restore the digital image at a receiving side, comprising:
a memory in communication with a processor to:
(W1) retrieve a digital image;
(W2) prepare a grayscale encryption key image with a desired encryption strength;
(W3) subject the digital image to convolution with the encryption key image, to remove high-frequency components in the digital image, to reduce the resolution thereof, and to encrypt the digital image, thus obtaining an encrypted image;
(W4) subject the encrypted image to entropy coding, thus converting the encrypted image into encrypted-image code;
(W5) transmit the encrypted-image code to another computer on a network;
(W6) receive, at said another computer, the encrypted-image code;
(W7) decode, at said another computer, the encrypted-image code by a decoding method corresponding to encoding used to perform entropy coding, thus generating a received encrypted image;
(W8) decrypt and prepare, at said another computer, the encryption key image, which is encrypted in advance, is separately delivered, and is used in the encryption means; and
(W9) restore, at said another computer, from the encryption key image and the received encrypted image, a maximum-likelihood digital image that has the maximum likelihood of the received encrypted image, wherein the encryption key image is an image of which a color of a background is black and having a design at its center.

13. A cryptographic-communication image compressing/expanding system according to claim 12, characterized in that subjecting the digital image to convolution with the encryption key image described in claim 12 comprises:
(W10) correcting the encryption key image such that the image size of the encryption key image is matched to that of the digital image, thus generating a third corrected encryption key image;
(W11) subjecting the third corrected encryption key image to Fourier transformation, thus generating a third-corrected-encryption-key-image spectrum;
(W12) subjecting the digital image to de-gamma correction and then dividing the digital image into a red-primary-color image RI, a green-primary-color image GI, and a blue-primary-color image BI;
(W13) subjecting the RI, the GI, and the BI to Fourier transformation, thus generating an RI spectrum, a GI spectrum, and a BI spectrum;
(W14) multiplying the RI spectrum by the third-corrected-encryption-key-image spectrum and setting the thus-obtained product as an RIE spectrum;
(W15) multiplying the GI spectrum by the third-corrected-encryption-key-image spectrum and setting the thus-obtained product as a GIE spectrum;
(W16) multiplying the BI spectrum by the third-corrected-encryption-key-image spectrum and setting the thus-obtained product as a BIE spectrum;
(W17) subjecting the RIE spectrum, the GIE spectrum, and the BIE spectrum to inverse Fourier transformation, thus generating an encrypted red-primary-color image RE in which a high-frequency region is removed, an encrypted green-primary-color image GE in which a high-frequency region is removed, and an encrypted blue-primary-color image BE in which a high-frequency region is removed; and
(W18) combining the RE, the GE, and the BE into a single color image and subjecting the color image to gamma correction, thus generating the encrypted image.

14. A cryptographic-communication image compressing/expanding system according to claim 13, characterized in that correcting the encryption key image described in claim 13 comprises:
(W50) matching the pixel size of the encryption key image to the pixel size of the digital image;
(W51) preparing the third corrected encryption key image having the same image size as the digital image and no data;
(W52) comparing the image size of the encryption key image with the image size of the digital image, advancing to step (W53) if they are equal to each other, advancing to step (W54) if the image size of the encryption key image is smaller than the image size of the digital image, and advancing to step (W57) otherwise;
(W53) transferring the encryption key image to the third corrected encryption key image and then ending the first correction;
(W54) moving the encryption key image such that the coordinates of the center pixel of the encryption key image are matched to the coordinates of the center pixel of the third corrected encryption key image;
(W55) transferring the encryption key image to the third corrected encryption key image;
(W56) transferring pixels in a transferred area of the third corrected encryption key image to a non-transferred area thereof by using the boundaries between the transferred area and the non-transferred area as mirror inversion axes and for ending the first correction; and
(W57) reducing the encryption key image so as to be matched to the image size of the digital image, transferring the reduced encryption key image to the third corrected encryption key image, and then ending the first correction.

15. A cryptographic-communication image compressing/expanding system according to claim 12, characterized in that restoring from the encryption key image and the received encrypted image described in claim 12 comprises:
(W20) correcting the encryption key image such that the image size of the encryption key image is matched to that of the received encrypted image, thus generating a fourth corrected encryption key image;
(W21) dividing the received encrypted image into a red-primary-color image, a green-primary-color image, and a blue-primary-color image;

(W22) setting the fourth corrected encryption key image as an H image, setting the red-primary-color image as a Y image, restoring an F image by performing image-restoration calculation in which the F image is restored from the H image and the Y image, and setting this F image as a red-primary-color digital image;

(W23) setting the green-primary-color image as a Y image, restoring an F image by performing the image-restoration calculation, and setting this F image as a green-primary-color digital image;

(W24) setting the blue-primary-color image as a Y image, restoring an F image by performing the image-restoration calculation, and setting this F image as a blue-primary-color digital image; and (W25) combining the red-primary-color digital image, the green-primary-color digital image, and the blue-primary-color digital image into the maximum-likelihood digital image.

16. A cryptographic-communication image compressing/expanding system according to claim 15, characterized in that performing the image-restoration calculation described in claim 15 comprises:

(W30) subjecting the H image to Fourier transformation, thus obtaining an H-image spectrum;

(W31) setting the maximum number of iterative operations;

(W32) setting a counter for counting the number of iterative operations to 0, thus resetting the counter;

(W33) subjecting the Y image to de-gamma correction, thus generating the Y image, and for setting the Y image to F-image initial values;

(W34) subjecting the F-image initial values to Fourier transformation, thus obtaining an F-image initial-value spectrum;

(W35) multiplying the H-image spectrum by the F-image initial-value spectrum and setting the thus-obtained product as a seventh function;

(W36) inverting the seventh function, thus generating an eighth function;

(W37) multiplying the Y image by the eighth function and setting the thus-obtained product as a ninth function;

(W38) subjecting the ninth function to Fourier transformation, thus obtaining a ninth-function spectrum;

(W39) obtaining a reversal function of the H image and setting the obtained function as a tenth function;

(W40) subjecting the tenth function to Fourier transformation, thus obtaining a tenth-function spectrum;

(W41) multiplying the ninth-function spectrum by the tenth-function spectrum and setting the thus-obtained product as an eleventh function;

(W42) subjecting the eleventh function to inverse Fourier transformation, thus obtaining a twelfth function;

(W43) multiplying the twelfth function by the F-image initial values and setting the thus-obtained product as the F image;

(W44) setting the F image to the F-image initial values;

(W45) adding 1 to the counter;

(W46) verifying a hypothesis in which the value of the counter exceeds the maximum number of iterative operations, returning to step W34 if the verification result is false, and advancing to step W47 if the verification result is true; and (W47) subjecting the F image to gamma correction, thus obtaining an F image, and for outputting the F image.

17. A cryptographic-communication image compressing/expanding system according to claim 16, characterized in that, in a second aspect of performing the image-restoration calculation described in claim 16, a point-symmetric image is used as the encryption key image, thereby eliminating the steps W39 and W40 and changing the step W41 to (W41C) multiplying the ninth-function spectrum by the H-image spectrum and setting the thus-obtained product as an eleventh function.

18. A cryptographic-communication image compressing/expanding system according to claim 15, characterized in that correcting the encryption key image described in claim 15 comprises:

(W60) matching the pixel size of the encryption key image to the pixel size of the received encrypted image;

(W61) preparing the fourth corrected encryption key image having the same image size as the received encrypted image and no data;

(W62) comparing the image size of the encryption key image with the image size of the received encrypted image, advancing to step (W63) if they are equal to each other, advancing to step (W64) if the image size of the encryption key image is smaller than the image size of the received encrypted image, and advancing to step (W67) otherwise;

(W63) transferring the encryption key image to the fourth corrected encryption key image and then ending the second correction;

(W64) moving the encryption key image such that the coordinates of the center pixel of the encryption key image are matched to the coordinates of the center pixel of the fourth corrected encryption key image;

(W65) transferring the encryption key image to the fourth corrected encryption key image;

(W66) transferring pixels in a transferred area of the fourth corrected encryption key image to a non-transferred area thereof by using the boundaries between the transferred area and the non-transferred area as mirror inversion axes and for ending the second correction; and (W67) reducing the encryption key image so as to be matched to the image size of the received encrypted image, transferring the reduced encryption key image to the fourth corrected encryption key image, and then ending the second correction.

19. A third program stored in a non-transitory medium to cause a computer to function as a cryptographic-communication image compressing/expanding system according to claim 12.

20. A fourth program stored in a non-transitory medium to cause a computer to function as a cryptographic-communication image compressing/expanding system according to claim 17.

* * * * *

UNITED STATES PATENT AND TRADEMARK OFFICE
CERTIFICATE OF CORRECTION

PATENT NO. : 9,883,215 B2
APPLICATION NO. : 15/104616
DATED : January 30, 2018
INVENTOR(S) : Mitsuo Eguchi Page 1 of 1

It is certified that error appears in the above-identified patent and that said Letters Patent is hereby corrected as shown below:

In Claim 11:
Column 37, Line 10, "second" should be deleted and --second program-- should be inserted.

Signed and Sealed this
Fifteenth Day of May, 2018

Andrei Iancu
*Director of the United States Patent and Trademark Office*